United States Patent
Dubach et al.

(10) Patent No.: US 11,053,721 B2
(45) Date of Patent: Jul. 6, 2021

(54) DRIVE DEVICE FOR A MOVABLE FURNITURE PART

(71) Applicant: Julius Blum GmbH, Hoechst (AT)

(72) Inventors: Fredi Dubach, Baeretwil (CH); Marco Ruecker, Hohenems (AT)

(73) Assignee: Julius Blum GmbH, Hoechst (AT)

( * ) Notice: Subject to any disclaimer, the term of this patent is extended or adjusted under 35 U.S.C. 154(b) by 449 days.

(21) Appl. No.: 15/652,808

(22) Filed: Jul. 18, 2017

(65) Prior Publication Data

US 2017/0314310 A1 Nov. 2, 2017

Related U.S. Application Data

(63) Continuation of application No. PCT/AT2015/000159, filed on Dec. 14, 2015.

(30) Foreign Application Priority Data

Jan. 29, 2015 (AT) .................................. A 39/2015

(51) Int. Cl.
*E05F 1/10* (2006.01)
*A47B 88/463* (2017.01)
(Continued)

(52) U.S. Cl.
CPC ............ *E05F 1/105* (2013.01); *A47B 88/463* (2017.01); *E05F 1/1016* (2013.01);
(Continued)

(58) Field of Classification Search
CPC ..... A47B 88/463; A47B 88/04; E05F 1/1016; E05F 1/105; E05F 1/1215; E05F 5/006;
(Continued)

(56) References Cited

U.S. PATENT DOCUMENTS 3,376,088 A * 4/1968 Bol ..................... E05C 19/165
292/353
6,357,803 B1 3/2002 Lorek
(Continued)

FOREIGN PATENT DOCUMENTS

AT 008 629 10/2006
AT 010 097 9/2008
(Continued)

OTHER PUBLICATIONS

Energy—Wikipedia, Aug. 31, 2019. (Year: 2019).*
(Continued)

*Primary Examiner* — Vinh Luong
(74) *Attorney, Agent, or Firm* — Wenderoth, Lind & Ponack, L.L.P.

(57) ABSTRACT

A drive device for a movable furniture part includes an ejection force accumulator which can be tensioned, and an ejection element mechanically loaded by the ejection force accumulator and used to carry out an ejection movement of the moveable furniture part from a closed position into an open position. The ejection movement can be initiated by a compression movement of the movable furniture part into a compression position which is behind the closed position. The drive device also comprises a tensioning device for tensioning the ejection force accumulator with energy which can be emitted by the ejection movement. During the compression movement, at least 50% of the energy emitted by the ejection force accumulator during the ejection movement can be introduced into the ejection force accumulator by the tensioning device.

20 Claims, 26 Drawing Sheets

(51) Int. Cl.
*F16H 37/12* (2006.01)
*E05F 1/12* (2006.01)

(52) U.S. Cl.
CPC .......... *E05F 1/1215* (2013.01); *F16H 37/12* (2013.01); *E05Y 2201/232* (2013.01); *E05Y 2201/484* (2013.01); *E05Y 2800/11* (2013.01); *E05Y 2900/20* (2013.01)

(58) Field of Classification Search
CPC .......... E05F 5/10; E05F 1/1058; E05B 65/46; E05C 19/022; F16H 37/12; F16H 21/40; E05Y 2201/232; E05Y 2201/484; E05Y 2800/11; E05Y 2900/20; E05Y 2201/426; E05Y 2201/434; Y10T 16/5324; Y10T 74/18568; Y10T 74/19684
See application file for complete search history.

(56) References Cited

U.S. PATENT DOCUMENTS

| | | | |
|---|---|---|---|
| 8,052,233 | B2 | 11/2011 | Netzer et al. |
| 8,282,175 | B2 | 10/2012 | Herper et al. |
| 9,277,815 | B2 | 3/2016 | Brunnmayr |
| 9,386,850 | B2 | 7/2016 | Dubach |
| 9,771,750 | B2 | 9/2017 | Held |
| 2004/0227439 | A1* | 11/2004 | Salice ............ E05F 5/02 312/333 |
| 2007/0180654 | A1* | 8/2007 | Gasser ............ F16H 21/40 16/242 |
| 2008/0048538 | A1* | 2/2008 | Karg ............ E05F 1/1066 312/319.2 |
| 2008/0121490 | A1* | 5/2008 | Dubach ............ E05F 1/1058 192/17 D |
| 2008/0265729 | A1 | 10/2008 | Netzer et al. |
| 2009/0307869 | A1 | 12/2009 | Salice |
| 2011/0131884 | A1 | 6/2011 | Herper et al. |
| 2013/0140970 | A1 | 6/2013 | Dubach |
| 2015/0361709 | A1 | 12/2015 | Stuke |
| 2016/0007749 | A1 | 1/2016 | Brunnmayr |
| 2016/0186476 | A1 | 6/2016 | Held |
| 2016/0242542 | A1* | 8/2016 | Friesenecker ............ E05F 15/63 |
| 2016/0376823 | A1 | 12/2016 | Huber et al. |
| 2017/0292307 | A1* | 10/2017 | Hirtsiefer ............ E05D 3/16 |
| 2018/0016829 | A1* | 1/2018 | Kaiser ............ E05D 11/10 |
| 2018/0100338 | A1* | 4/2018 | Dubach ............ E05F 1/16 |
| 2020/0131818 | A1* | 4/2020 | Sobolewski ............ E05D 3/122 |

FOREIGN PATENT DOCUMENTS

| | | | |
|---|---|---|---|
| CN | 103742016 | | 4/2014 |
| DE | 198 23 305 | | 12/1999 |
| DE | 20 2005 002 433 | | 6/2005 |
| DE | 20 2006 013 028 | | 2/2008 |
| DE | 10 2011 052 355 | | 2/2013 |
| DE | 102016006301 | A1 * | 7/2016 |
| EP | 2248981 | A1 * | 11/2010 |
| JP | 2006-299545 | | 11/2006 |
| WO | WO 2006114352 | A1 * | 11/2006 |
| WO | 2011/143682 | | 11/2011 |
| WO | 2012/084594 | | 6/2012 |
| WO | 2013/017666 | | 2/2013 |
| WO | 2013/134797 | | 9/2013 |
| WO | 2013/134799 | | 9/2013 |
| WO | 2014/114514 | | 7/2014 |
| WO | 2014/165876 | | 10/2014 |

OTHER PUBLICATIONS

Define energy—Google Search, Aug. 31, 2019. (Year: 2019).*
EPO Machine Translation of DE 202005002433 (U1), Grass BmbH Hoechst, May 19, 2005 (Year: 2005).*
Define transmission ratio—Google Search, Apr. 11, 2020. (Year: 2020).*
Derwent Abstract of WO 2006/114352 A1, Nuttelmann et al., Nov. 2, 2006. (Year: 2006).*
Derwent English Abstractor EP 2248981 A1, Abele et al., Nov. 10, 2010. (Year: 2010).*
Derwent English Abstractor DE 102016006301 A1, Jager et al., Jul. 21, 2016. (Year: 2016).*
Energy / Definition, Types & Examples / Britannica, britannica. com/science/energy, Apr. 12, 2020. (Year: 2020).*
Written Opinion of the International Searching Authority, International application No. PCT/AT2015/000159, dated Jul. 15, 2016. (Year: 2016).*
EPO Machine Translation of WO 2006114352 A1 of Nuttelmann, Nov. 2, 2006 (Year: 2006).*
Define potential energy, Google Search, Aug. 14, 2020 (Year: 2020).*
International Search Report dated Jul. 15, 2016 in International (PCT) Application No. PCT/AT2015/000159.
English translation of Search Report issued with Office Action dated Nov. 16, 2018 in Chinese Application No. 201580077112.X.

* cited by examiner

DRIVE DEVICE FOR A MOVABLE FURNITURE PART

BACKGROUND OF THE INVENTION

The invention concerns a drive device for a movable furniture part, comprising an ejection force storage member which can be tensioned, and an ejection element for carrying out an ejection movement of the movable furniture part from a closed position into an open position. The ejection movement can be initiated by an over-pressing movement of the movable furniture part into an over-pressing position which is behind the closed position, and the ejection element is force-actuated by the ejection force storage member and a tensioning device for tensioning the ejection force storage member with energy which can be released during the ejection movement. Further, the invention concerns an item of furniture with a furniture carcass, a movable furniture part and such a drive device.

For many years in the industry of furniture fittings, there have been several kinds of drive devices to enable an easy ejection of a movable furniture part (as, for example, a drawer or a furniture door) from a closed position. Thereby, a user does not have to pull the movable furniture part in order to open it, but the user can activate or initiate the ejection or opening by an ease triggering movement (e. g. by over-pressing the movable furniture part). Some examples for this are disclosed in the documents WO 2012/084594 A1, WO 2014/114514 A1, WO 2014/165876 A1 and WO 2013/134799 A1.

Mostly, one problem with mechanical drive devices is how and where the ejection force storage member is tensioned. In the simplest versions, an ejection force storage member is tensioned in the last closing movement section before reaching the closed position (e. g. according to the ballpoint pen principle). Then, during the ejection, the active ejection is carried out along the same movement section in opening direction.

However, there are also other drive devices where the ejection force storage member is tensioned further outward during opening or closing (thus not in the last closing or opening section). An example of this configuration is specified in the AT 008 629 U1. A similar device is also disclosed in the DE 198 23 305 A1.

Now, however, with many known drive devices, depending on the force of the ejection force storage member or depending on the weight of the movable furniture part, the tensioning movement is considered to be disturbing. This means there is no continuous and uniform opening or closing movement as indeed the tensioning of the ejection force storage member has to be carried out at least on a part of the opening and/or closing path. In this section, thus, the movement of the movable furniture part is less smooth.

SUMMARY OF THE INVENTION

Hence, the object of the present invention is to provide an improved drive device compared to the prior art. In particular, the drive device should be constructed in such a way that a largely smooth and uniform movement of the movable furniture part between the open position and the closed position is provided.

Therefore, according to the invention, at least 50% of the energy released by the ejection force storage member (spring) during the ejection movement can be introduced into the ejection force storage member by the tensioning device during the over-pressing movement. In other words, the major part of the loading energy (spring force) for the ejection force storage member is introduced in the ejection force storage member only in the over-pressing movement. With known constructions it is indeed so that mostly much more than 90% of the loading energy is introduced somewhere in the region of the opening or closing movement. A small and negligible part of the loading energy was already sometimes introduced during the over-pressing movement, as also during the over-pressing movement in several construction variants of so-called touch latch mechanisms it had to be pressed against the ejection force storage member (see e. g. WO 2011/143682 A1). Thus, a substantially smoother movement sequence of the movable furniture part is guaranteed, as not the complete part of the loading energy for the ejection force storage member has to be introduced before reaching the closed position.

Preferably, during the over-pressing movement, at least 80% of the energy released by the ejection force storage member during the ejection movement can be introduced into the ejection force storage member by the tensioning device. In particular, it is of a great advantage if, during the over-pressing movement, almost 100% of the energy released by the ejection force storage member during the ejection movement can be introduced into the ejection force storage member by the tensioning device. This means that the tensioning of the ejection force storage member is carried out as late as with reaching the closed position, hence between the closed position and the over-pressing position. In other words, the tensioning of the ejection force storage member is only carried out in the section of the over-pressing movement of the furniture part movement path.

A further aspect of the present invention concerns a generic drive device, wherein the movable furniture part can travel a furniture part tensioning distance during tensioning of the ejection force storage member by the tensioning device, in which tensioning distance the ejection force storage member is movable from a relaxed or partly tensioned position along a force storage tensioning distance into a tensioned position. A furniture part ejection distance can be travelled by the movable furniture part during the ejection of the movable furniture part by the ejection element, in which ejection distance the ejection force storage member is movable from the tensioned position along a force storage relaxing distance into the relaxed or partly tensioned position.

Another problem which often occurs with the state of the art is that the loading of the ejection force storage member has to be carried out along a relatively long furniture part movement path during opening and/or closing. Thus, a user has to carry out this relatively long tensioning movement.

A further object of the present invention thus is to improve such drive devices or to provide an alternative tensioning possibility.

This is attained in that the furniture part ejection distance is larger than the furniture part tensioning distance. This means that only a relatively small furniture part movement path (furniture part tensioning distance) is used in order to still have available a larger furniture part movement path (furniture part ejection distance) for the ejection movement after the over-pressing.

Particularly preferably, the furniture part tensioning distance for the most part corresponds to a furniture part movement distance during the over-pressing movement. In other words, during the over-pressing movement almost 100% of the energy released by the ejection force storage member during the ejection movement can be introduced by the tensioning device. Especially when the furniture part tensioning distance corresponds substantially exactly to the over-pressing movement, this has the advantage that a user does not recognize at all the tensioning during the normal furniture part movement path as the tensioning indeed only takes place during the over-pressing movement.

In order to reach a possibly short furniture part tensioning distance, the furniture part ejection distance is at least double, preferably at least four times, as large as the furniture part tensioning distance. The loading of the ejection force storage member and the unloading of the ejection force storage member does not have to be carried out with a linear energy output or a linear energy input. Rather, curve progressions or differently steep loading or unloading sequences can also be provided depending on the type and form of the spring or force storage member. Preferably, along the furniture part tensioning distance averaged, the proportion of the force storage tensioning distance to the furniture part tensioning distance during the over-pressing movement is larger than, preferably along the furniture part ejection distance averaged, the proportion of the force storage relaxing distance to the furniture part ejection distance during the ejection movement.

For the implementation of the present invention, there are different specific embodiments. In the following, two variants are explained in detail.

According to a first embodiment, the drive device comprises a transmission device arranged between a tensioning element of the tensioning device and the ejection element. Here, preferably the transmission or the transmission ratio between the tensioning element and the ejection force storage member during tensioning of the ejection force storage member is different, preferably larger, than between the ejection element and the ejection force storage member during the ejection of the movable furniture part. This means that, on a shorter path (furniture part tensioning distance) the same energy is introduced by the transmission device which is then released on a longer path (furniture part ejection distance). In this case, preferably the tensioning element and the ejection element are formed separately.

According to a specific example of this first embodiment, preferably the tensioning device comprises a housing, an axial bolt connected to the housing,
a tensioning disk rotationally supported on the axial bolt, the tensioning disk comprising latching elements, the tensioning element being eccentrically connected to the tensioning disk, a transmission disk rotationally supported on the axial bolt, the transmission disk comprising latching stops for the latching elements, and
the ejection force storage member which is mounted with a first spring base to the tensioning disk and with a second spring base to the housing.

For an easy tensioning, preferably the tensioning disk can be rotated by the tensioning element relative to the transmission disk during the over-pressing movement, whereby the ejection force storage member arrives from the relaxed or partly tensioned position in the tensioned position. In the tensioned position, the tensioning disk is latched by at least one of the latching elements on one latching stop of the transmission disk.

In this first embodiment, the tensioning element is formed separately from the ejection element, which is preferably movably supported on the housing. Preferably, a lever is movably supported via a first end on the ejection element, and the lever is eccentrically and movably connected on the second end to a gear wheel, and the gear wheel meshes with teeth arranged on the transmission disk. Thus, the ejection element can be actuated by the transmission disk. These components together with the tensioning disk, the ejection force storage member, and the transmission disk form the transmission device.

In contrast to the first embodiment, no transmission based on a gear wheel transmission is carried out in the second embodiment. Rather, in the case of the second embodiment, it is so that the ejection force storage member comprises a first spring base and a second spring base. During tensioning of the ejection force storage member, both spring bases are movable relative to a housing of the drive device. During ejecting, the first spring base is fixed relative to the housing, and the second spring base is movable relative to the housing. Thereby, a smaller furniture part movement path can be used during tensioning by the movement of both spring bases in order to introduce the same energy which is then used for the ejection movement in a larger (only in one direction acting) furniture part movement path.

Particularly preferred, this is improved in that the tensioning device comprises a first and a second movable tensioning element, each preferably rotationally supported on the housing. The first spring base of the ejection force storage member is mounted to the first tensioning element, and the second spring base of the ejection force storage member is mounted to the second tensioning element. In this embodiment, in contrast to the first embodiment, it is advantageous when the second tensioning element forms the ejection element. Thus, less parts are necessary.

Further, preferably during the over-pressing movement, the first tensioning element and the second tensioning element are movable relative to each other and relative to the housing, whereby the ejection force storage member arrives from the relaxed or partly tensioned position in the tensioned position. In order to guarantee the movement of only one spring base, preferably during the ejection movement one of the tensioning element, preferably the first tensioning element, is held to the housing during at least a large part of the ejection movement by a holding device.

The invention also concerns an item of furniture with a furniture carcass, a movable furniture part, and a drive device according to the invention for the movable furniture part.

BRIEF DESCRIPTION OF THE DRAWINGS

Further details and advantages of the present invention are described more fully hereinafter by the specific description with reference to the embodiments illustrated in the drawings, in which.

DETAILED DESCRIPTION OF THE INVENTION

Figure 1:
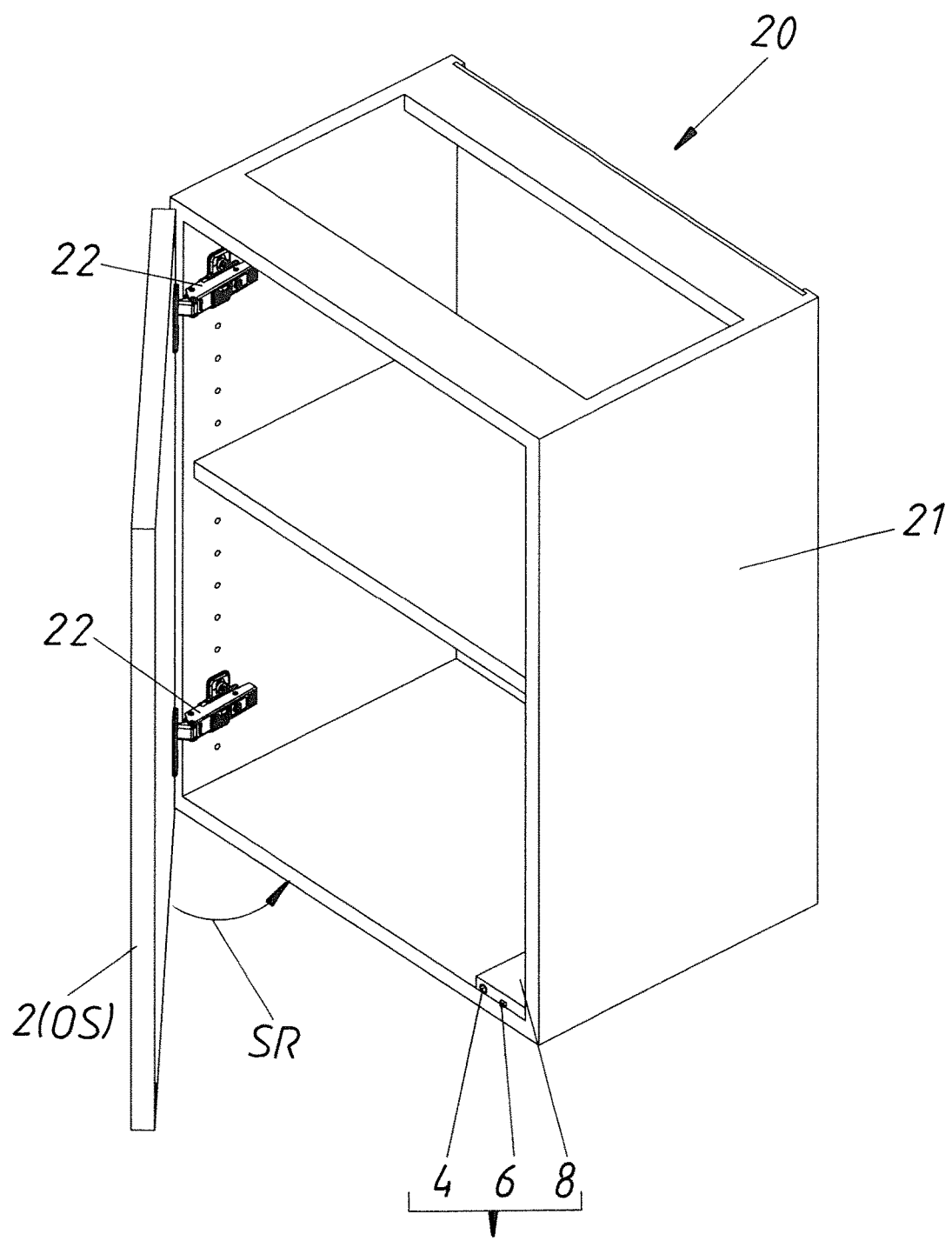
FIG. 1 is a perspective view of an item of furniture with a drive device.

FIG. 1 shows an item of furniture 20 which comprises a furniture carcass 21 and a movable furniture part 2 in form of a furniture door. This movable furniture part 2 is situated in the open position OS. The movable furniture part 2 is movably supported on the furniture carcass 21 by two hinges 22. These hinges 22 are designed in such a way that an active retraction of the movable furniture part 2 into the closed position SS is carried out in the last section of the closing movement S running in a closing direction SR. The hinges 22 can also comprise a damping device for a damped retraction of the movable furniture part. Moreover, a drive device 1 in the form of an ejection device is mounted to the furniture carcass 21 by a housing 8 or a mounting plate. In this first embodiment, the drive device 1 comprises a tensioning element 6 and an ejection element 4 formed separately from the tensioning element 6.

Figure 2:
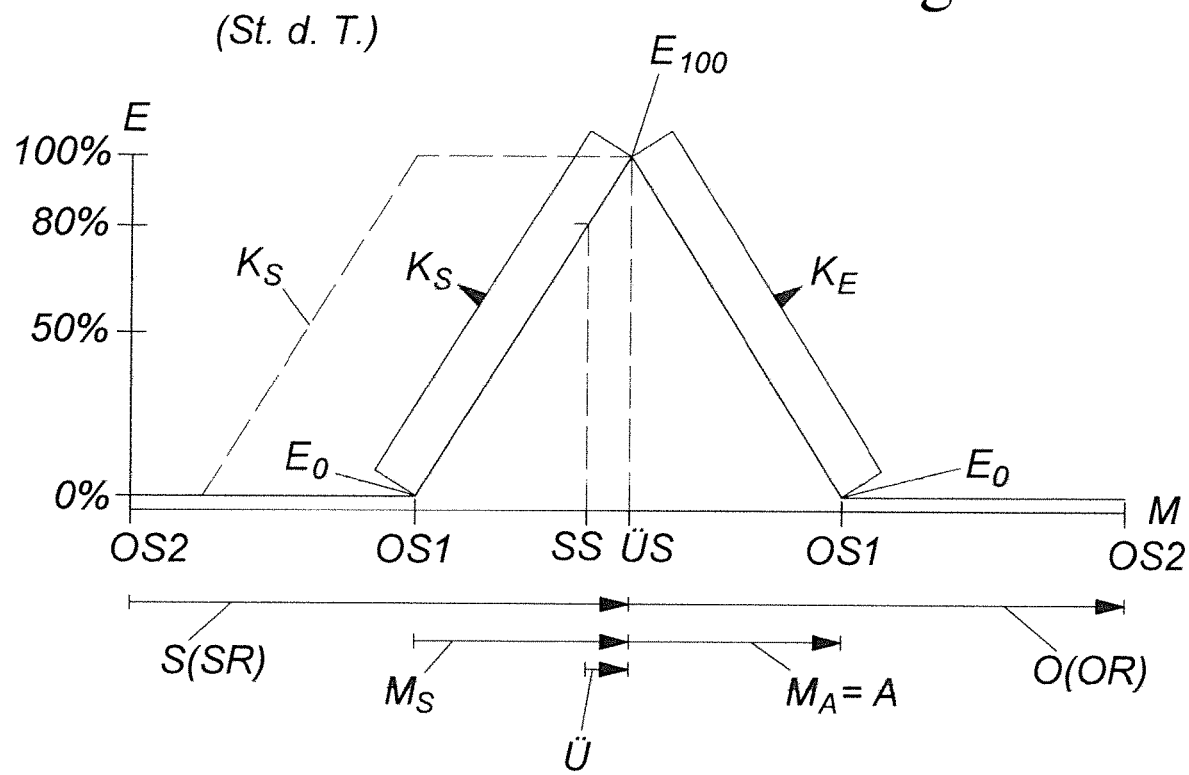
FIG. 2 shows the furniture part movement path in comparison with the energy of the ejection force storage member according to the state of the art.

FIG. 2 schematically shows the furniture item movement distance M in comparison to the (loading) energy E of the ejection force storage member 3 in a drive device according to the state of the art. The whole furniture part movement distance M is illustrated horizontally. The furniture part movement distance M is composed of the closing movement S running in the closing direction SR and the opening movement O running in opening direction OR. In the closing movement S, the movable furniture part 2 initially moves from the second open position OS2 in a free-running to the first open position OS1. During this movement sequence, no tensioning of the ejection force storage member 3 is carried out, and the ejection force storage member 3 stays in the relaxed position $E_0$ (The subscript number after the "E" always corresponds approximately the loading percentage of the ejection force storage member 3 with energy E). Starting from the first open position OS1, the tensioning of the ejection force storage member 3 begins. This is indicated in that the loading energy E of the ejection force storage member 3 increases from the first open position OS1, until the ejection force storage member 3 is finally fully loaded in the over-pressing position ÜS of the movable furniture part 2. This means the ejection force storage member 3 is in the tensioned position $E_{100}$. The force storage tensioning distance $K_S$ is situated between this relaxed position $E_0$ and the tensioned position $E_{100}$. In principle, it is also possible that this force storage tensioning distance $K_S$ is situated further outward, as this is indicated by the dashed line illustrated on the left side. This can especially be provided in the case when a separate retraction device for retracting the movable furniture part 2 into a closed position SS is provided. As is further illustrated in FIG. 2, the force storage tensioning distance $K_S$ of the ejection force storage member 3 is travelled in that a user is actively pressing onto the movable furniture part 2 in closing direction SR. This active furniture part movement distance M corresponds to the furniture part tensioning distance $M_S$ which extends between the first open position OS1 and the over-pressing position ÜS. As is illustrated in FIG. 2, the ejection force storage member 3 is only loaded for approximately 80% when reaching the closed position SS. In the case of specific construction examples, the ejection force storage member 3 is mostly already much more loaded in the closed position SS than in this schematic illustration. The over-pressing movement Ü of the furniture part movement distance M is located between the closed position SS and the over-pressing position ÜS. As soon as the over-pressing movement Ü is finished and the user is no longer pressing in closing direction SR onto the movable furniture part 2, the ejection movement A begins by the unloading of the ejection force storage member 3. This ejection movement A equates to the furniture part ejection distance $M_A$, in which the ejection force storage member 3 moves between the tensioned position $E_{100}$ along the force storage relaxing distance $K_E$ until the relaxed position $E_0$. Thereby, the first open position OS1 is reached again. Thereafter, the movable furniture part 2 can be moved in a free-running till the complete open position OS2.

It is disadvantageous with this known movement sequence according to the state of the art that a user does not experience a uniform movement of the movable furniture part 2 in a large part of the furniture part movement distance M (specifically during the closing movement S), as indeed in the region of the force storage tensioning distance $K_S$ starting from the first open position OS1 a larger force has to be actively applied onto the movable furniture part 2 compared to the case with a movable furniture part 2 being in a free-running.

Figure 3:
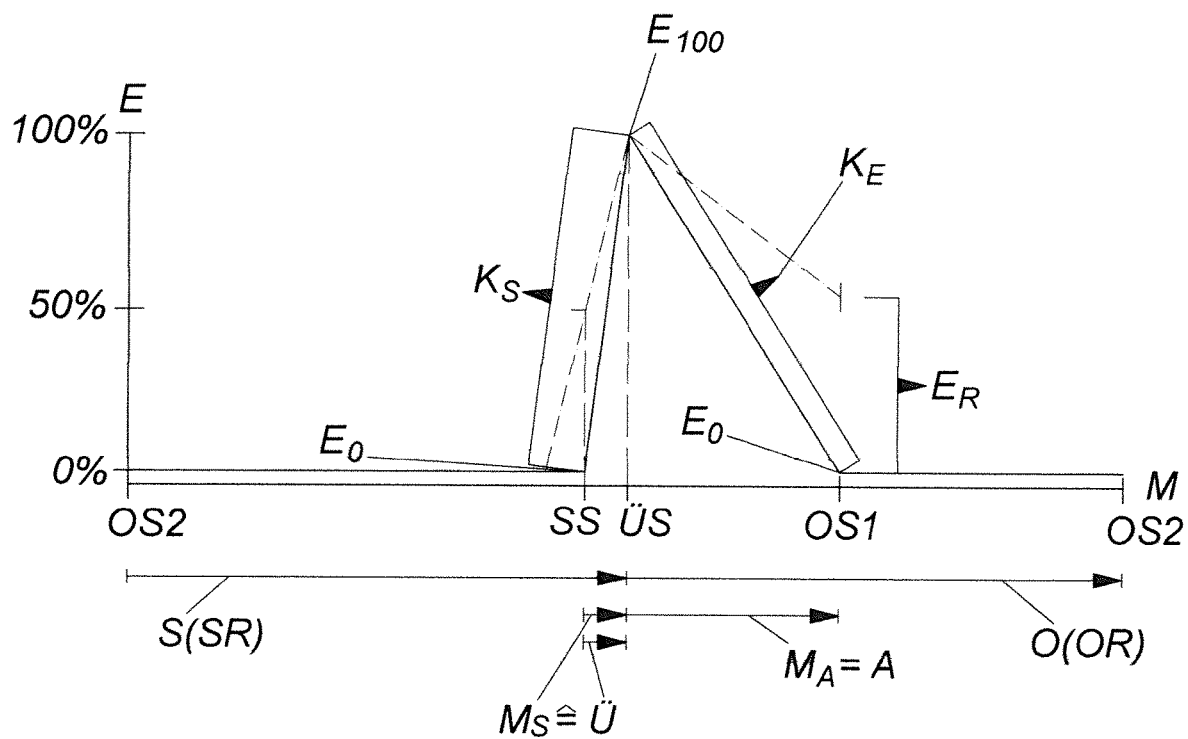
FIG. 3 shows the furniture part movement path in comparison with the energy of the ejection force storage member in a drive device according to the invention.

Therefore, the large advantage of the present invention is illustrated in FIG. 3, whereupon the force storage tensioning distance $K_S$ begins as late as when the closing position SS of the movable furniture part 2 is reached; or whereupon the large part of the loading energy E is only introduced in the ejection force storage member 3 when the closing position SS of the movable furniture part 2 is reached. Accordingly, the furniture part tensioning distance $M_S$ is much shorter in FIG. 3. Specifically, this furniture part tensioning distance $M_S$ corresponds to the over-pressing distance Ü. Thus, the full energy E is introduced into the ejection force storage member 3 in a relatively short section of the furniture part movement distance M during the over-pressing movement Ü by moving the ejection force storage member 3 from the relaxed position $E_0$ (corresponds to the closing position SS) along the force storage tensioning distance $K_S$ into the tensioned position $E_{100}$ which corresponds to the over-pressing position ÜS of the movable furniture part 2. As soon as a user is no longer pressing onto the movable furniture part 2 in this over-pressing position ÜS, the ejection movement A is carried out similar to or the same as in the already-known drive devices. This means this ejection movement A corresponds to the furniture part ejection distance $M_A$ which is substantially larger than the furniture part tensioning distance $M_S$. Once the first open position OS1 is reached, the movable furniture part 2 can again be moved in a free-running until the fully open position OS2.

In FIG. 3, the loading energy E of the ejection force storage member 3 is indicated with the continuous line. In this case, this line is illustrated idealized. Of course, there can be deviations. Especially, the loading energy can also be increase progressively or non-linearly. There can also be differently steep sections during tensioning as well as during relaxing. This FIG. 3 shall schematically illustrate the averaged progress between the relaxed position $E_0$ and the tensioned position $E_{100}$.

Beside the basic explanation of the inventive idea, in FIG. 3 still slightly modified variants are also indicated by the dot-dashed lines.

The dot-dashed line on the right side corresponds to the first specific embodiment of the drive device 1. In this case, it is so that at the end of the ejection movement A the ejection force storage member 3 is in the relaxed or partly tensioned position $E_{0-50}$ in which the ejection force storage member 3 is still partly tensioned and contains residual energy $E_R$, wherein by this residual energy $E_R$ of the ejection force storage member 3 the ejection element 4 is movable in the closing direction SR along an ejection element returning distance $A_R$ after travelling an ejection element ejection distance $A_A$. Thus, only a part of the (loading) energy E introduced in the furniture part tensioning distance $M_S$ is also used as (ejection) energy for the ejection. The residual energy ER is specifically used for the returning movement of the ejection element 4 into an initial position.

The dot-dashed line on the left side corresponds to the second specific embodiment of the drive device 1. In this case, in the closed position SS of the movable furniture part 2, the ejection force storage member 3 is in the relaxed or partly tensioned position $E_{0-50}$, wherein when reaching the closed position SS the ejection force storage member 3 is already partly tensioned by a closing movement S of the movable furniture part 2. This means that the tensioning of the ejection force storage member 3 already begins before reaching the closed position SS. The large part, namely over 50%, of the loading energy E is still introduced in the ejection force storage member 3 only between the closed position SS and the over-pressing position ÜS.

For the comparison between the furniture part tensioning distance (first distance) $M_S$ and the furniture part ejection distance (second distance) $M_A$, however, it is necessary in both embodiments to compare the same relaxed or partly tensioned position $E_{0-50}$ of the force storage tensioning distance $K_S$ with the same relaxed or partly tensioned position $E_{0-50}$ of the force storage relaxing distance $K_E$. It is possible from this to always derive that the furniture part tensioning distance (first distance) $M_S$ is smaller than the furniture part ejection distance (second distance) $M_A$.

In FIG. 3, it can additionally be discerned that the proportion $K_S:M_S$ of the force storage tensioning distance $K_S$ to the furniture part tensioning distance $M_S$ during the over-pressing movement Ü is about 9:1. In contrast, the proportion $K_E:M_A$ of the force storage relaxing distance $K_E$ to the furniture part ejection distance $M_A$ during the ejection movement A is about 9:6 or 3:2, respectively. Thereby, the proportion $K_S:M_S$ is larger than the proportion $K_E:M_A$. The inclination approximately corresponds to the transmission from the furniture part tensioning distance $M_S$ to the force storage tensioning distance $K_S$ and from the force storage relaxing distance $K_E$ to the furniture part ejection distance $M_A$, respectively.

Figure 4:
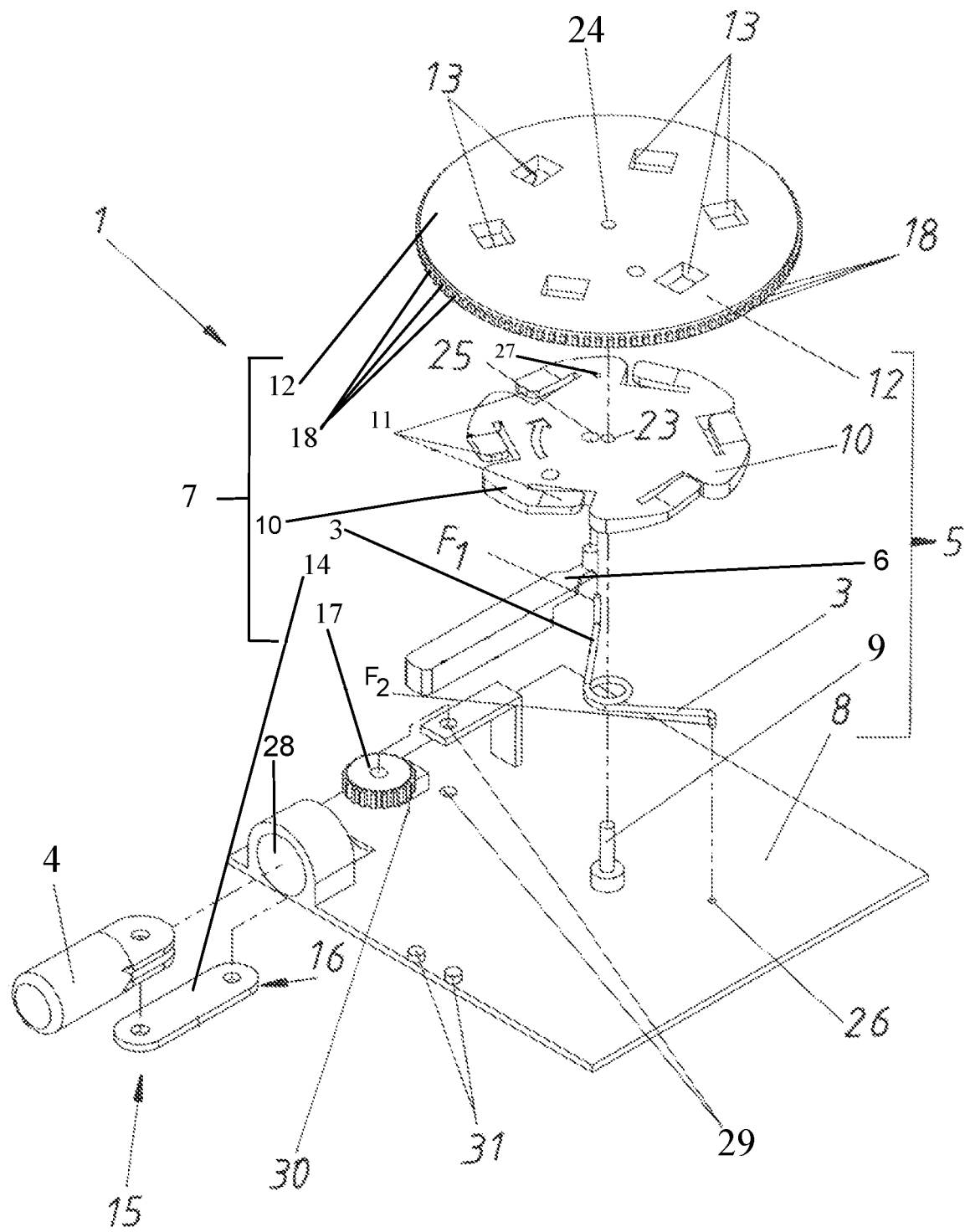
FIG. 4 is an exploded view of a first embodiment of the drive device.

FIG. 4 shows an exploded view of the first embodiment of a drive device. This drive device 1 comprises a housing 8 (base plate) and a transmission device 7. The axial bolt 9 is mounted to this housing 8. The tensioning disk 10 is rotationally supported on the axial bolt 9 by the recess 23. The transmission device 7 includes the transmission disk 12 with the teeth 18 and the gear wheel 17. Further, the transmission disk 12 is rotationally supported on the axial bolt 9 by the recess 24. The ejection force storage member 3 in the form of a leg spring is coiled or arranged around the axial bolt 9. The ejection force storage member 3 is held by the first spring base $F_1$ in the recess 27 of the tensioning disk 10. The ejection force storage member 3 is held by the second spring base $F_2$ in the recess 26 of the housing 8. The tensioning disk 10 comprises in total six regularly arranged latching elements 11 in the form of spring tongues. This spring tongues or latching elements 11 correspond with the six latching stops 13 formed in the transmission disk 12. An eccentrically arranged recess 25 is formed in the tensioning disk 10. A bolt of the tensioning element 6 engages in this eccentrically arranged recess 25. This tensioning element 6 is guided between the guiding elements 31. On the outer circumference of the transmission disk 12 a plurality of teeth 18 is arranged which mesh with the teeth of the gear wheel 17. This gear wheel 17 is rotationally supported in a rotary bearing 29 in the housing 8 by a rotary bolt 34. Further, an eccentric axis 30 is arranged on the gear wheel 17. A second end 16 of a lever 14 is connected to this eccentric axis 30 by a lever pivot bolt 33. On the first end 15 of the lever 14, the lever 14 is connected to the ejection element 4 by the lever pivot bolt 33. This ejection element 4, in turn, is guided in the guide 28 formed in the housing 8.

Figure 5A:
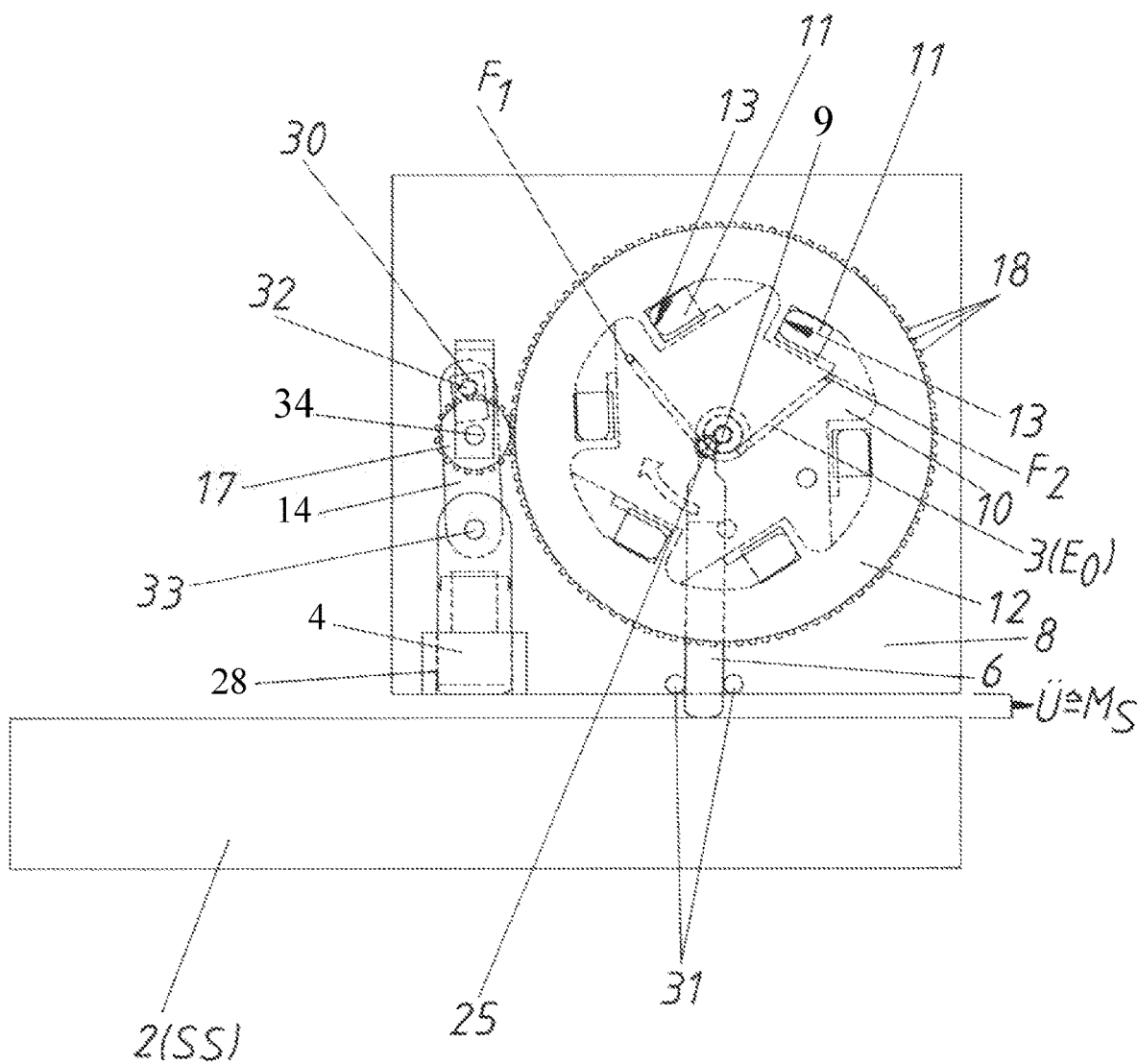
FIG. 5a-12 show the movement sequence of a drive device according to the first embodiment.
Figure 5B:
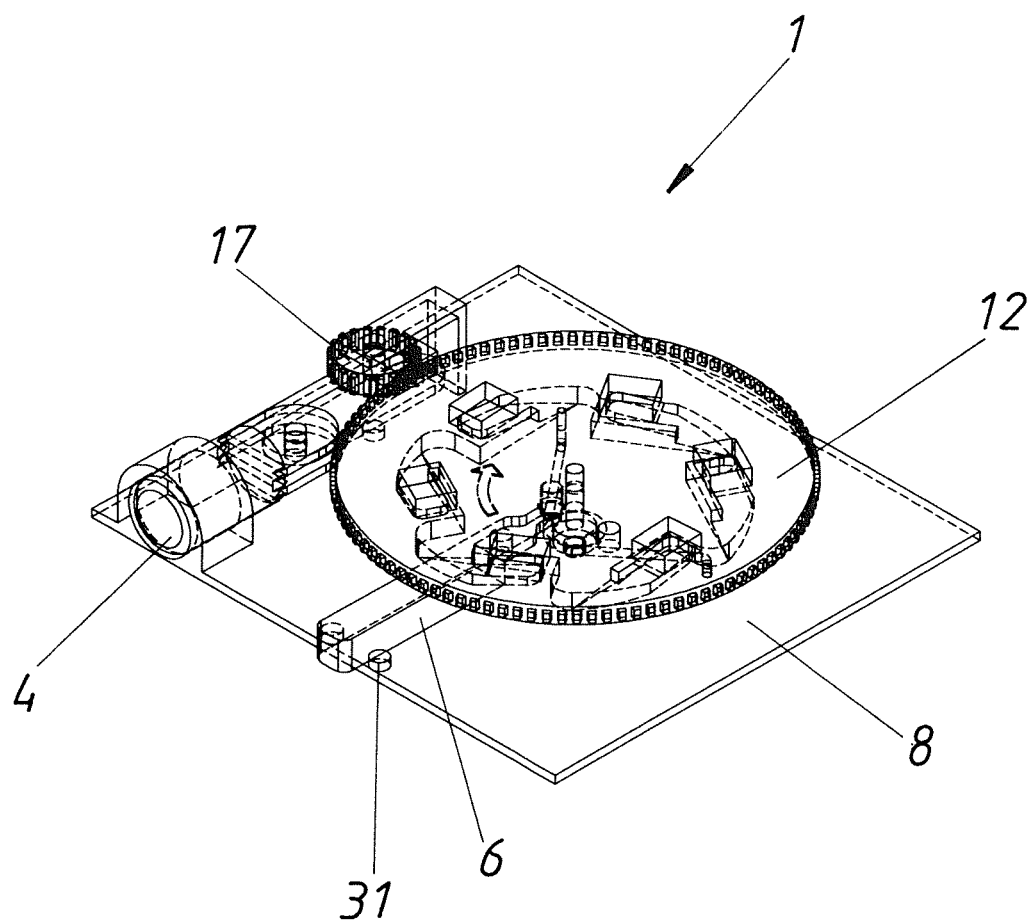

The drive device 1 is illustrated in the FIGS. 5a and 5b in different perspectives. The movable furniture part 2 is in the closed position SS. In this closed position SS, the movable furniture part 2 abuts the tensioning element 6. As the ejection force storage member 3 slightly force-actuates the tensioning disk 10 counterclockwise, the latching elements 11 of the tensioning disk 10 abut the latching stops 13 of the transmission disk 12. The ejection force storage member 3 is in the substantially relaxed position $E_0$.

Figure 6A:
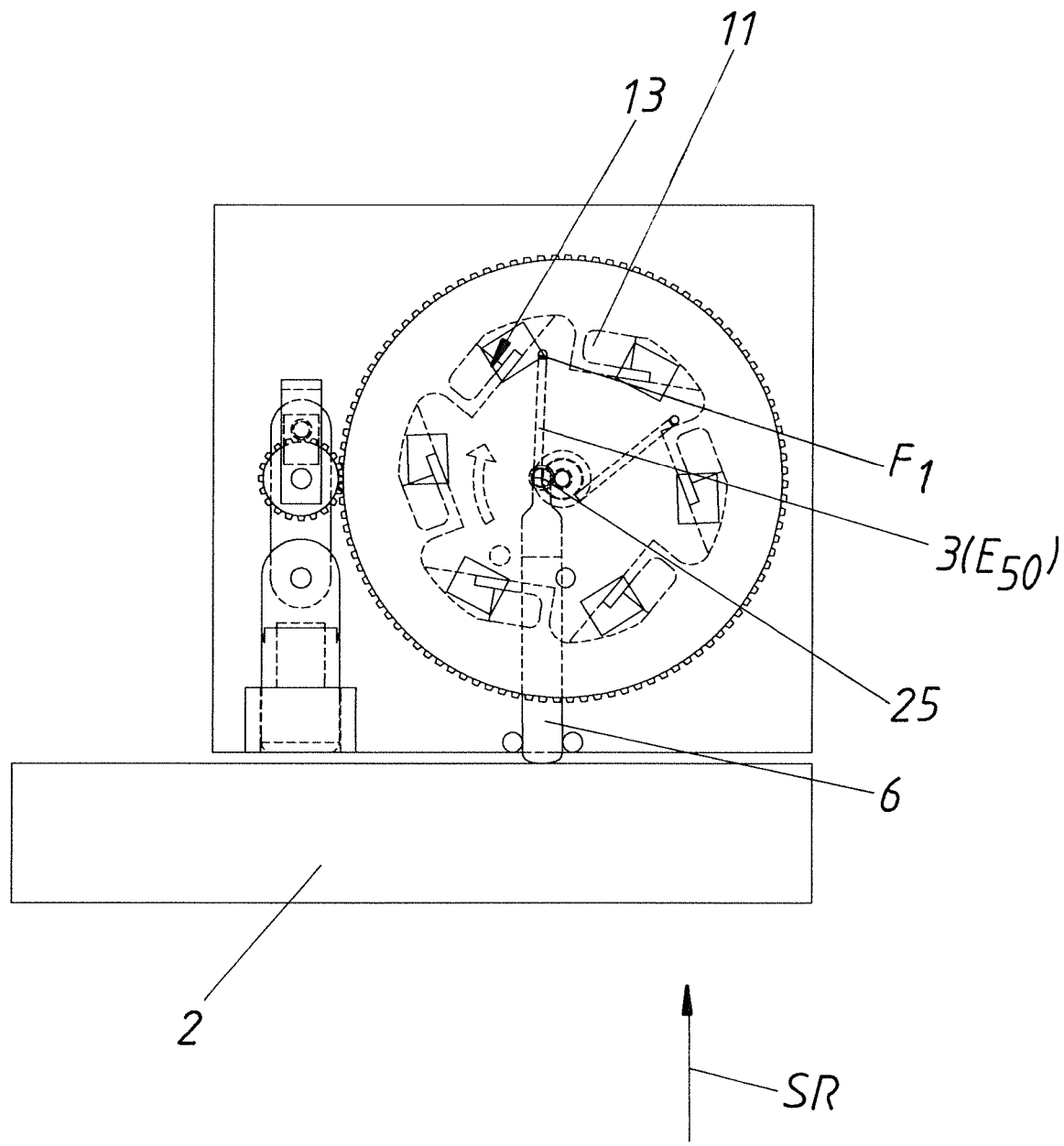
Figure 6B:
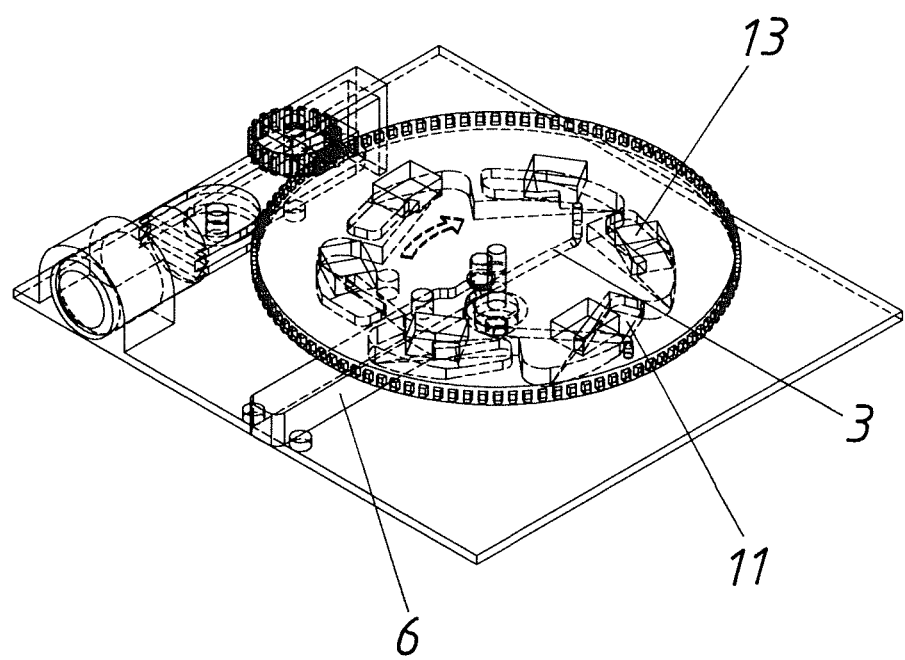

If now pressing onto the movable furniture part 2 in the closing direction SR according to the FIGS. 6a and 6b, the tensioning element 6 is also moved in the closing direction SR. Because this tensioning element 6 is rotationally supported on the eccentrically arranged recess 25 of the tensioning disk 10, the tensioning disk 10 is also rotated clockwise around the axial bolt 9. Consequently, the ejection force storage member 3 reaches the partly tensioned position $E_{50}$. By this movement of the tensioning element 6 in the closing direction SR, the tensioning disk 10 is rotated clockwise relative to the transmission disk 12. Thereby, the latching elements 11 raise from the latching stops 13 and glide—with a slight bending of the latching elements 11 formed as spring tongues—along the underside of the transmission disk 12.

Figure 7A:
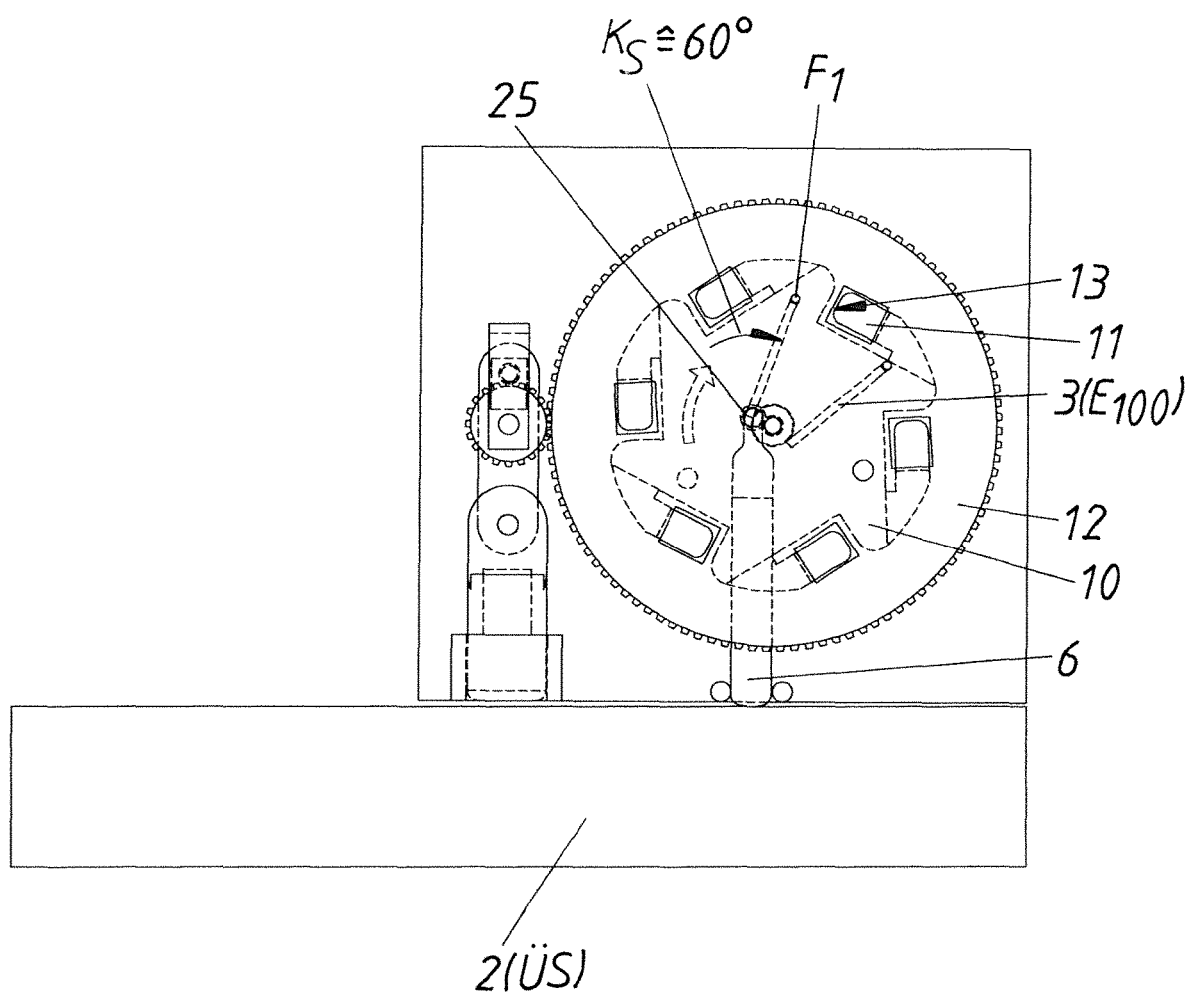
Figure 7B:
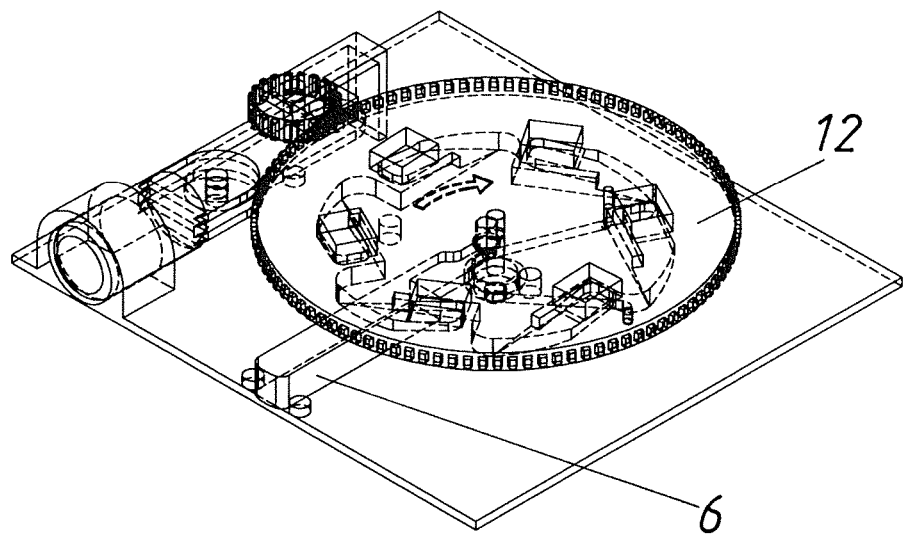

In FIGS. 7a and 7b, the subsequent over-pressing position ÜS of the movable furniture part 2 is shown, in which the tensioning element 6 is fully pushed in. Thereby, the latching elements 11 are latched in the (clockwise) nearest recesses with the latching stops 13 in the transmission disk 12. According to FIGS. 7a and 7b the tensioning disk 10 has been rotated around 60° compared to the FIGS. 5a and 5b. This equals to the force storage tensioning distance $K_S$ which corresponds with the (relatively short) furniture part tensioning distance $M_S$ (see FIG. 5a). In FIG. 7a the ejection force storage member 3 is in the tensioned position $E_{100}$.

Figure 8A:
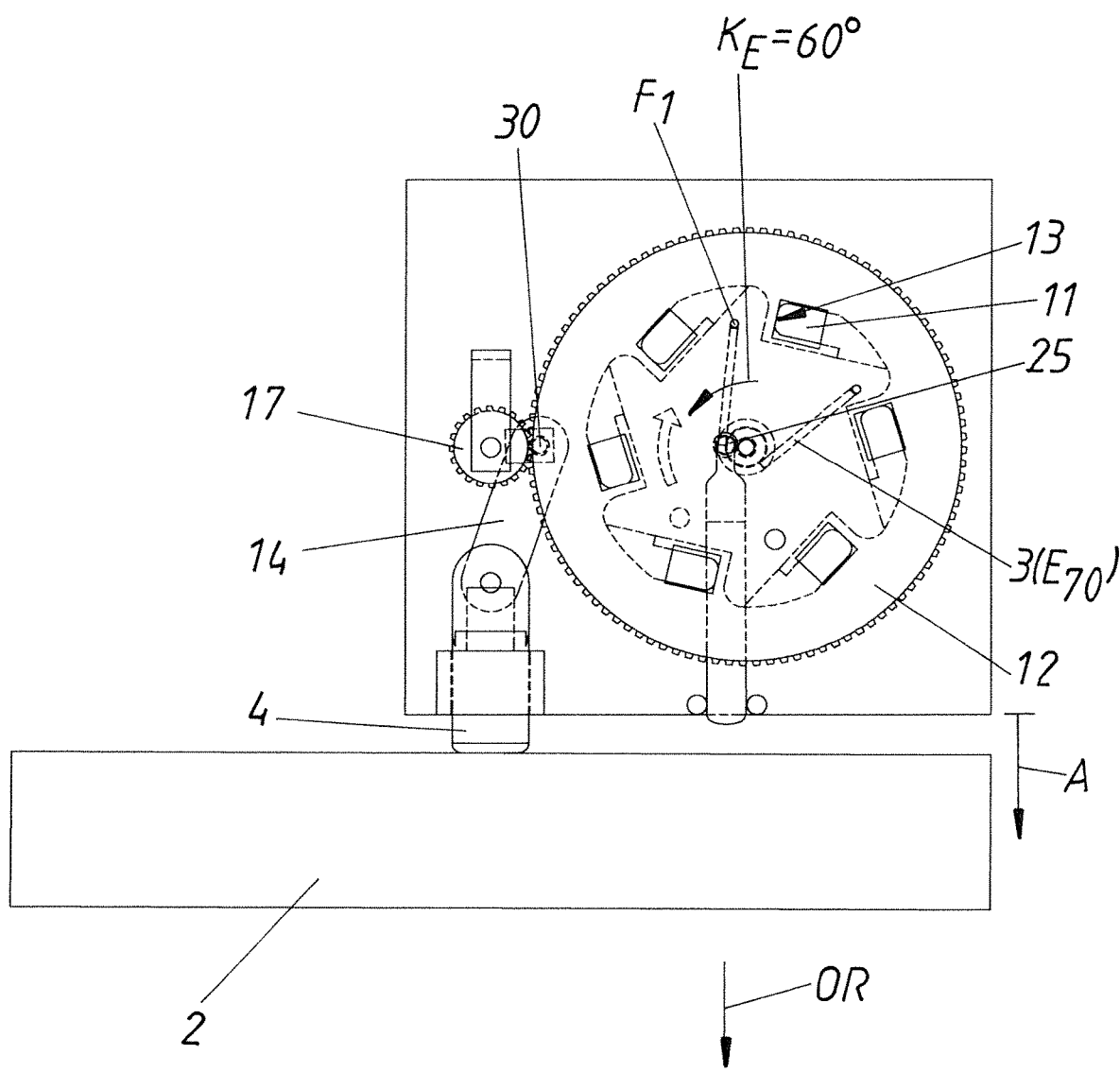
Figure 8B:
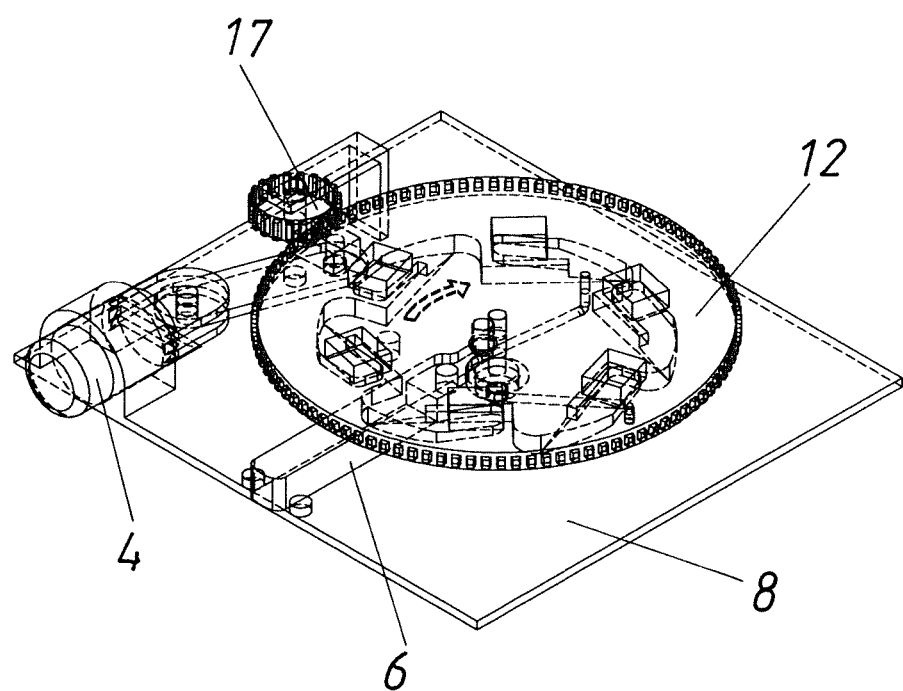

Once the movable furniture part 2 is released in this over-pressing position ÜS, the ejection force storage member 3 can be relaxed till the partly relaxed position $E_{70}$ as indicated in the FIGS. 8a and 8b. As this relaxing movement of the tensioning disk 10 is carried out counterclockwise, the transmission disk 12 is also moved counterclockwise by the latching elements 11 and the latching stops 13. Based on the teeth 18 of this transmission disk 12 which mesh with the teeth of the gear wheel 17, the gear wheel 17 is rotated clockwise. As thereby also the eccentric axis 30 connected with the gear wheel 17 and, thus, also the lever 14 by the lever pivot bolt 32 moves, also the ejection element 4 is moved in opening direction OR. As this ejection element 4, in turn, abuts the movable furniture part 2, the ejection movement A of the movable furniture part 2 is initiated.

Figure 9A:
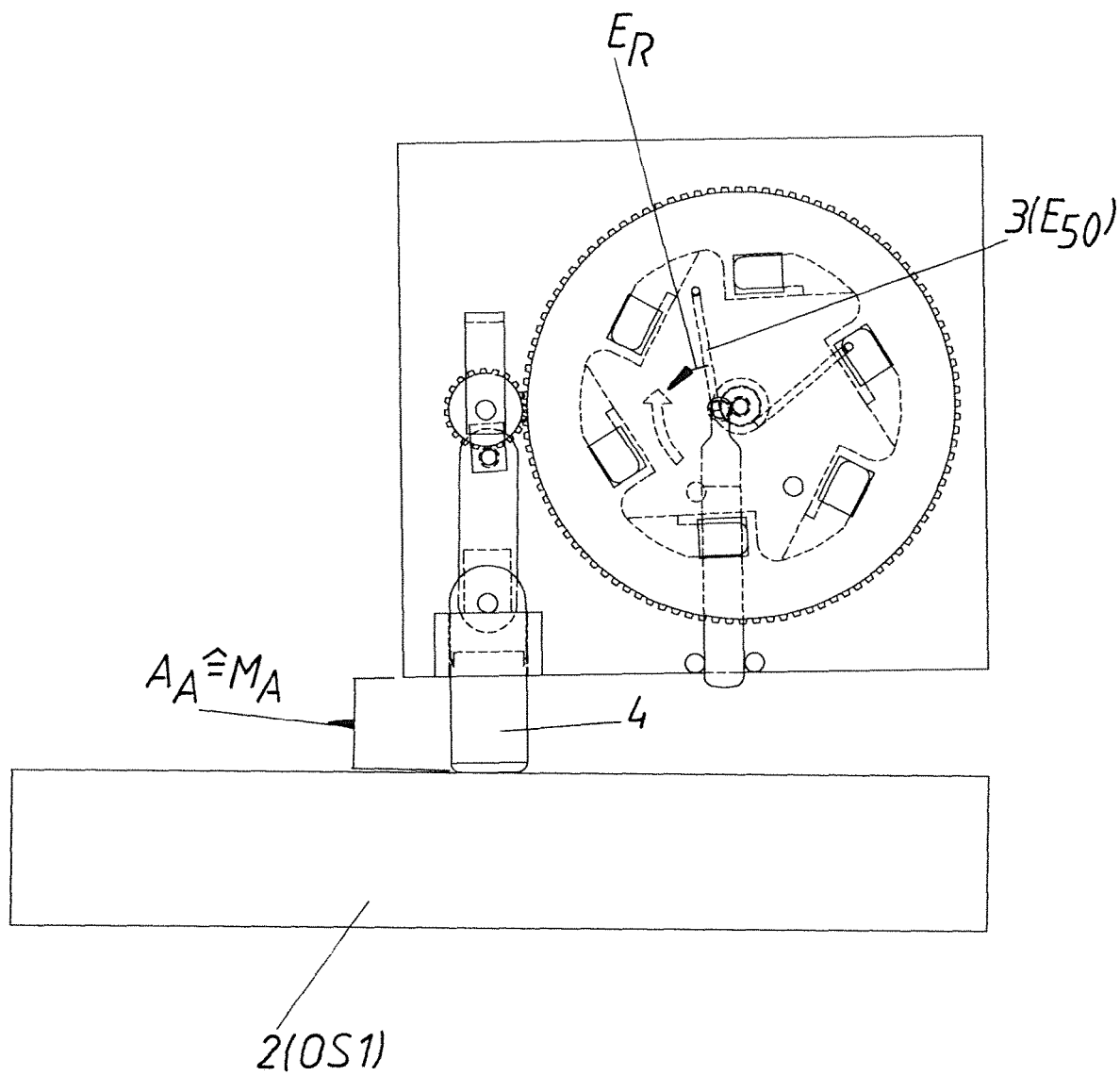
Figure 9B:
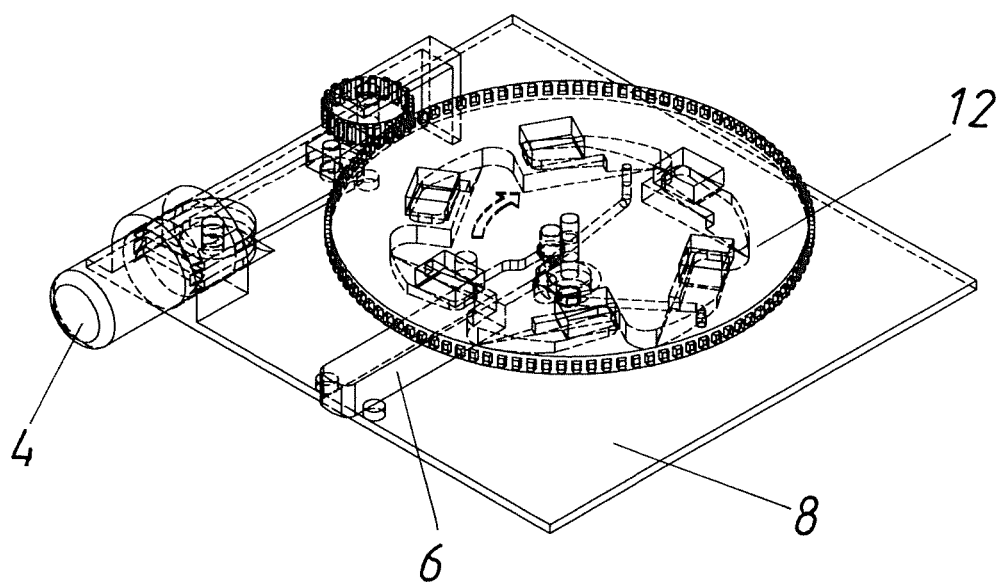

According to FIGS. 9a and 9b, the gear wheel 17 has carried out a half revolution, whereby the ejection element ejection distance $A_A$ is completed. This ejection element ejection distance $A_A$ equals the furniture part ejection distance $M_A$. Thereby, the movable furniture part 2 reaches the first open position OS1. As, however, in this first open position OS1 the ejection force storage member 3 has only relaxed about halfway and thus is in the partly relaxed position $E_{50}$, residual energy $E_R$ remains in the ejection force storage member 3.

Figure 10:
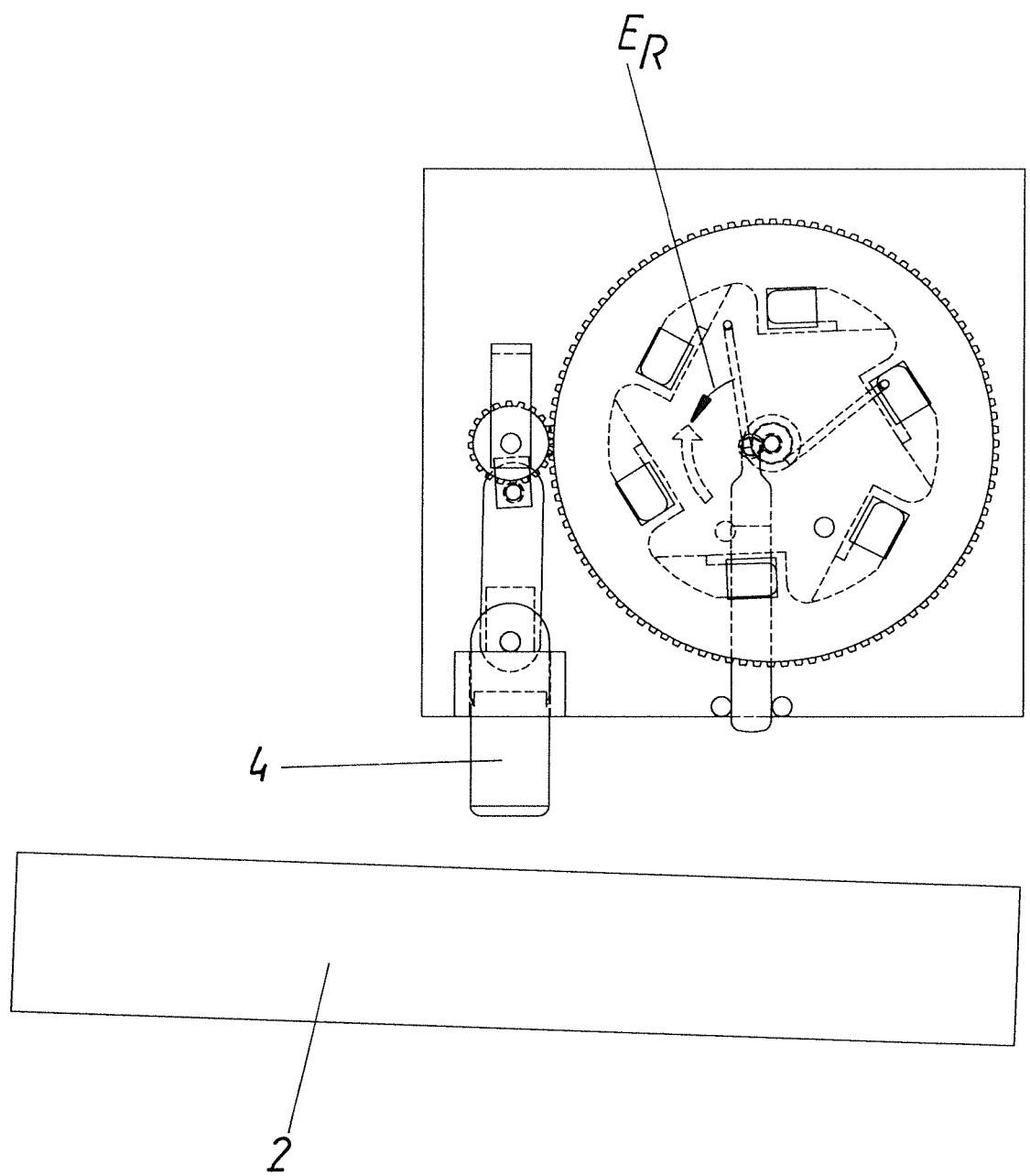

In FIG. 10 it is illustrated that e. g. based on the ejection momentum the movable furniture part 2 is distanced from the ejection element 4. This can also be carried out in that a user is actively pulling the movable furniture part 2.

Figure 11A:
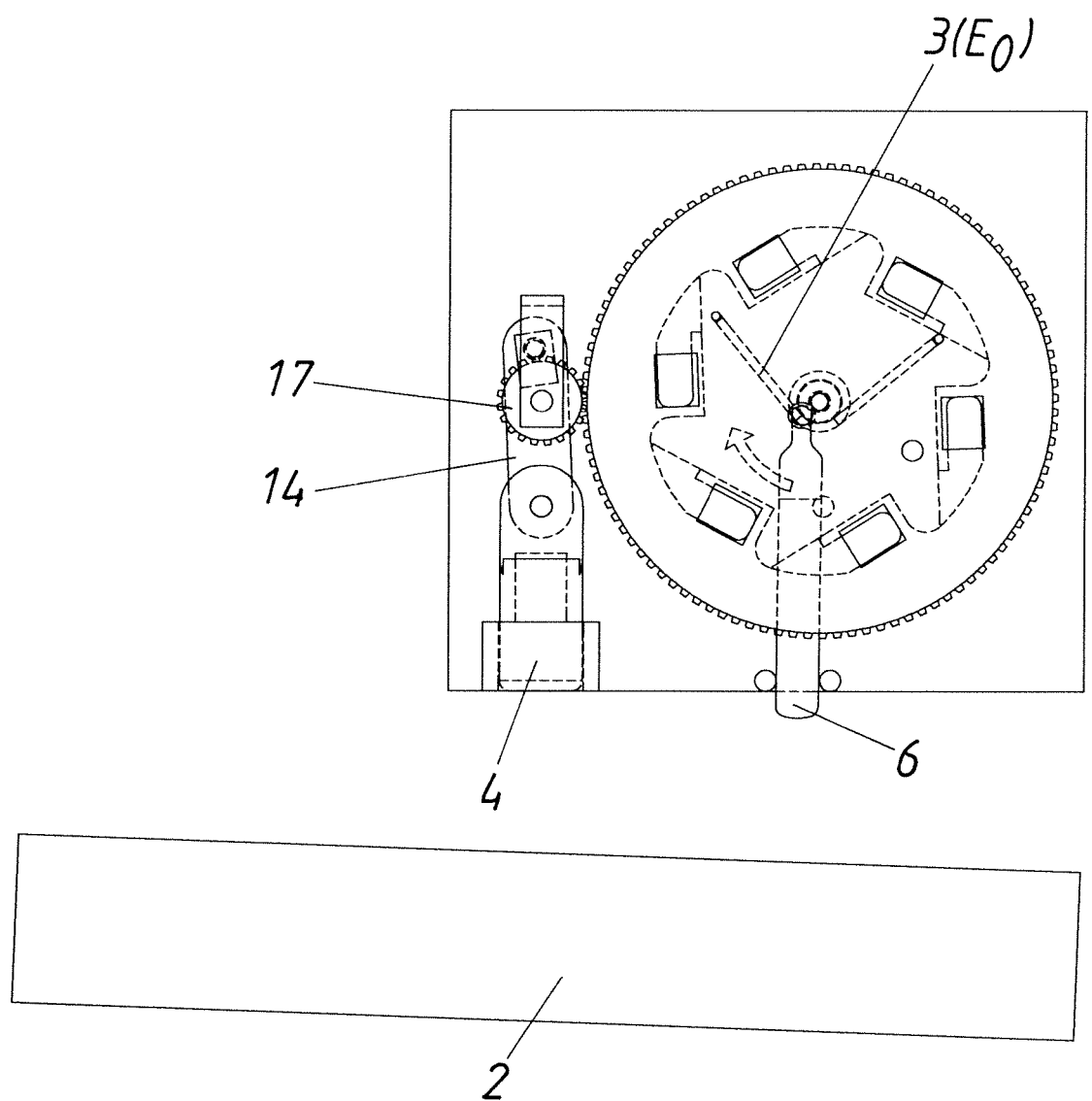
Figure 11B:
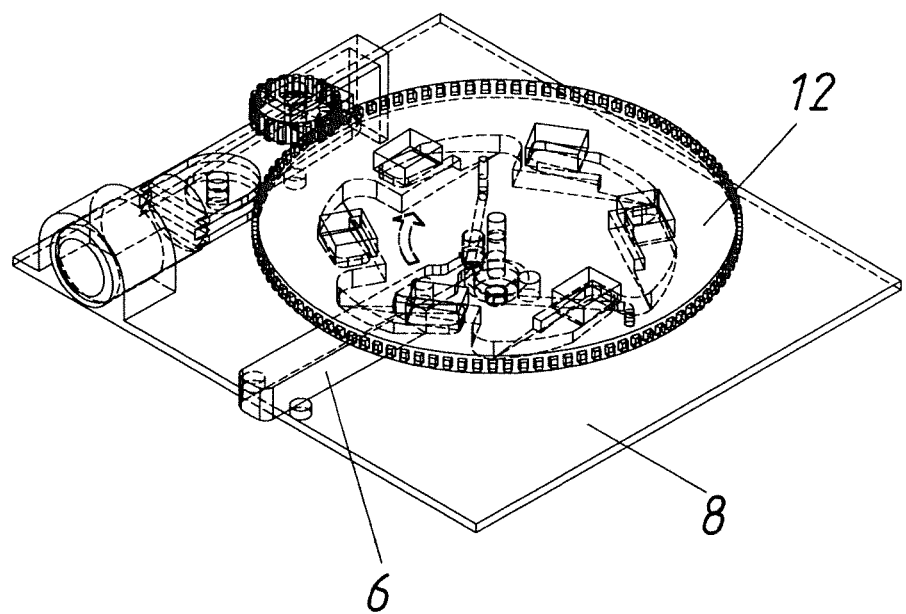

In the FIGS. 11 and 11*b*, it is illustrated that the residual energy $E_R$ of the ejection force storage member 3 has unloaded. Thereby, also the gear wheel 17 has been again moved to its starting position and the ejection element 4 is completely retracted. The tensioning element 6, as well as the ejection force storage member 3 and the tensioning disk 10, are again in the initial position according to the FIGS. 5*a* and 5*b*.

Figure 12:
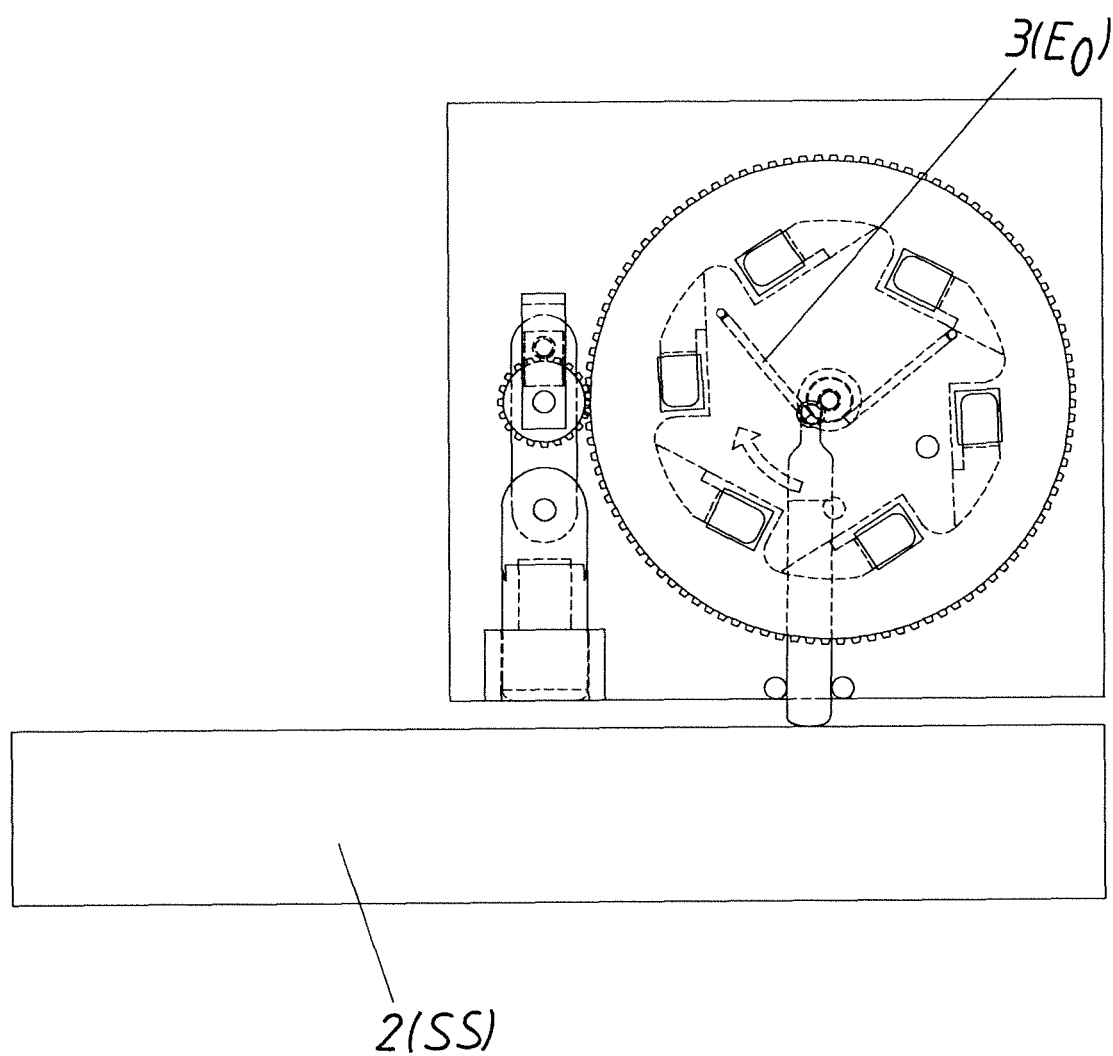

In FIG. 12 also the movable furniture part 2 has again been moved to the closed position SS by the hinges 22. The movable furniture part 2 abuts the tensioning element 6. Beginning from this closed position SS, a new tensioning movement of the ejection force storage member 3 can again be started.

Figure 13:
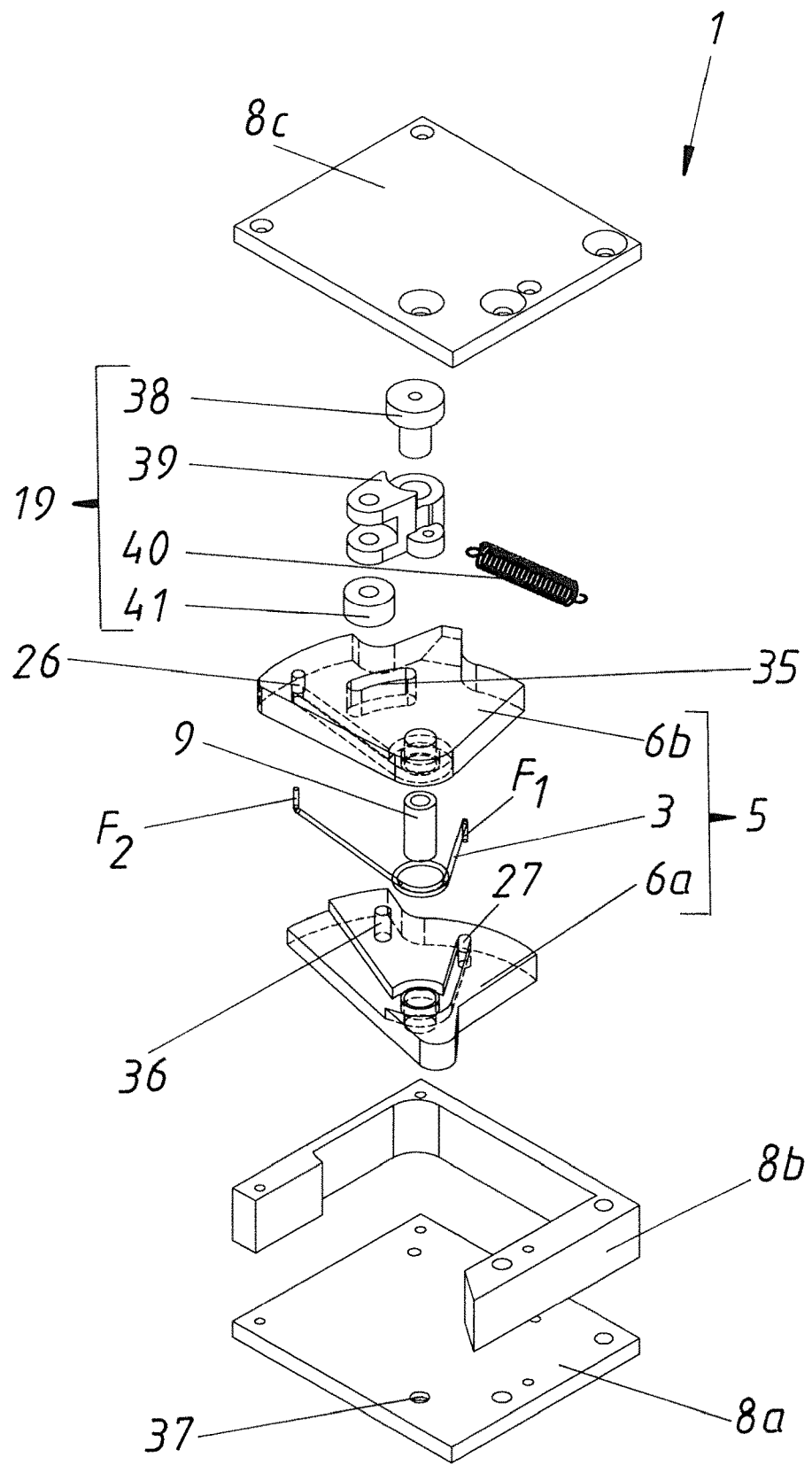
FIG. 13 is an exploded view of a drive device according to the second embodiment.

In FIG. 13, an exploded view of the second embodiment of a drive device 1 is illustrated. In this case, the housing 8 comprises the three housing parts 8*a*, 8*b* and 8*c*. In this case, the tensioning device 5 comprises the first tensioning element 6*a*, the ejection force storage member 3 and the second tensioning element 6*b*. The axial bolt 9 is attached to the holding recess 37 on the housing part 8*a*. The first tensioning element 6*a* as well as the second tensioning element 6*b* is rotationally supported on the axial bolt 9. The first spring base $F_1$ of the ejection force storage member 3 is held in the recess 27 of the first tensioning element 6*a*. The second spring base $F_2$ of the ejection force storage member 3 is held in the recess 26 of the second tensioning element 6*b*. An elongated hole 35 is formed in the second tensioning element 6*b*. A limit bolt 36 of the first tensioning element 6*a* engages the elongated hole 35. Further, the drive device 1 comprises a holding device 19 for a tensioning element 6*a*, 6*b*. This holding device 19 comprises a rotary bearing 38 attached to the housing 8. The swiveling lever 39 is pivotally supported ton this rotary bearing 38. On this swiveling lever 39, in turn, a guiding roll 41 is movably attached. The tension spring 40 is held on the one hand on the swiveling lever 39 and on the other hand on the housing 8.

Figure 14:
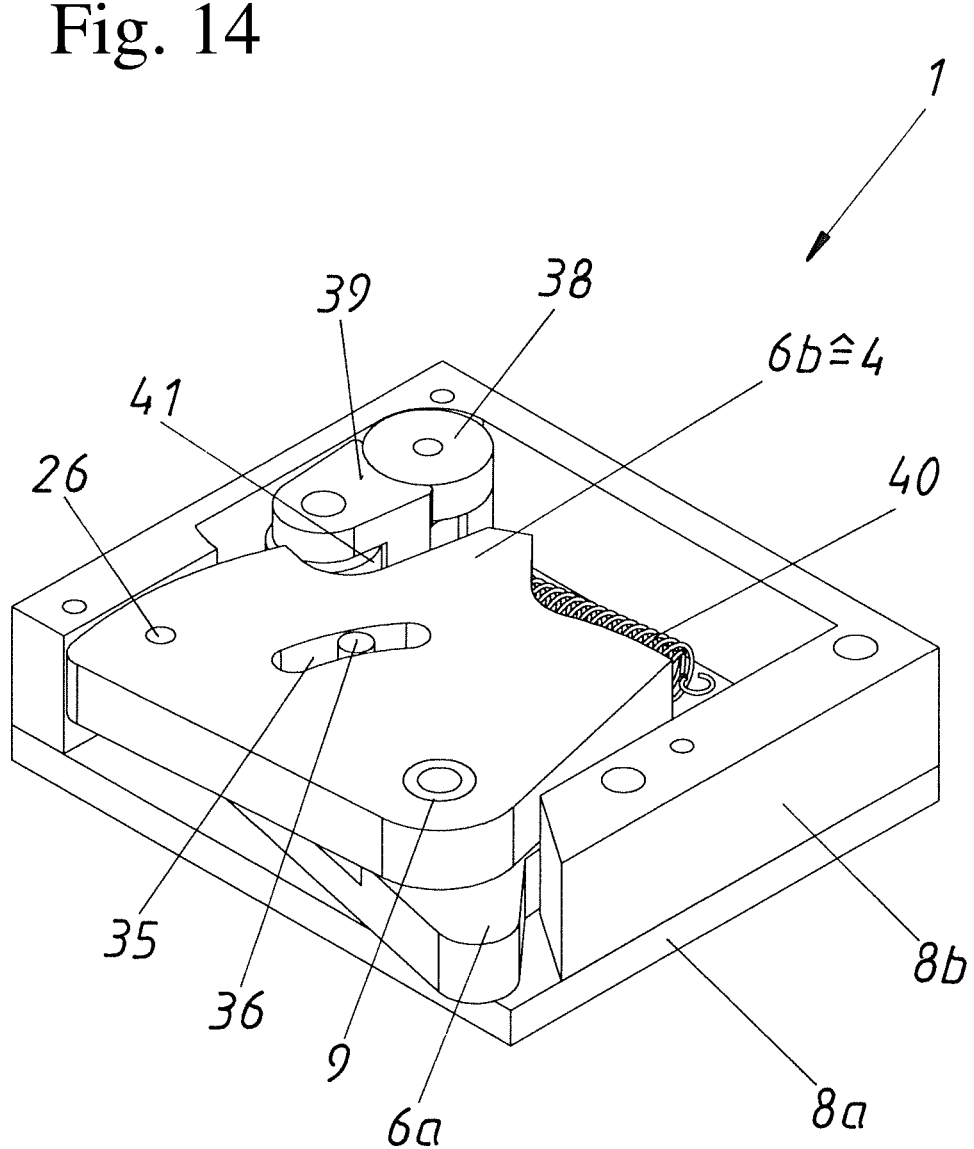
FIG. 14 shows the drive device according to the second embodiment in an assembled state.

In FIG. 14, the drive device 1 according to the second embodiment is illustrated in an assembled state. It is also illustrated that in this case, the second tensioning element 6*b* forms the ejection element 4 of the drive device 1.

Figure 15:
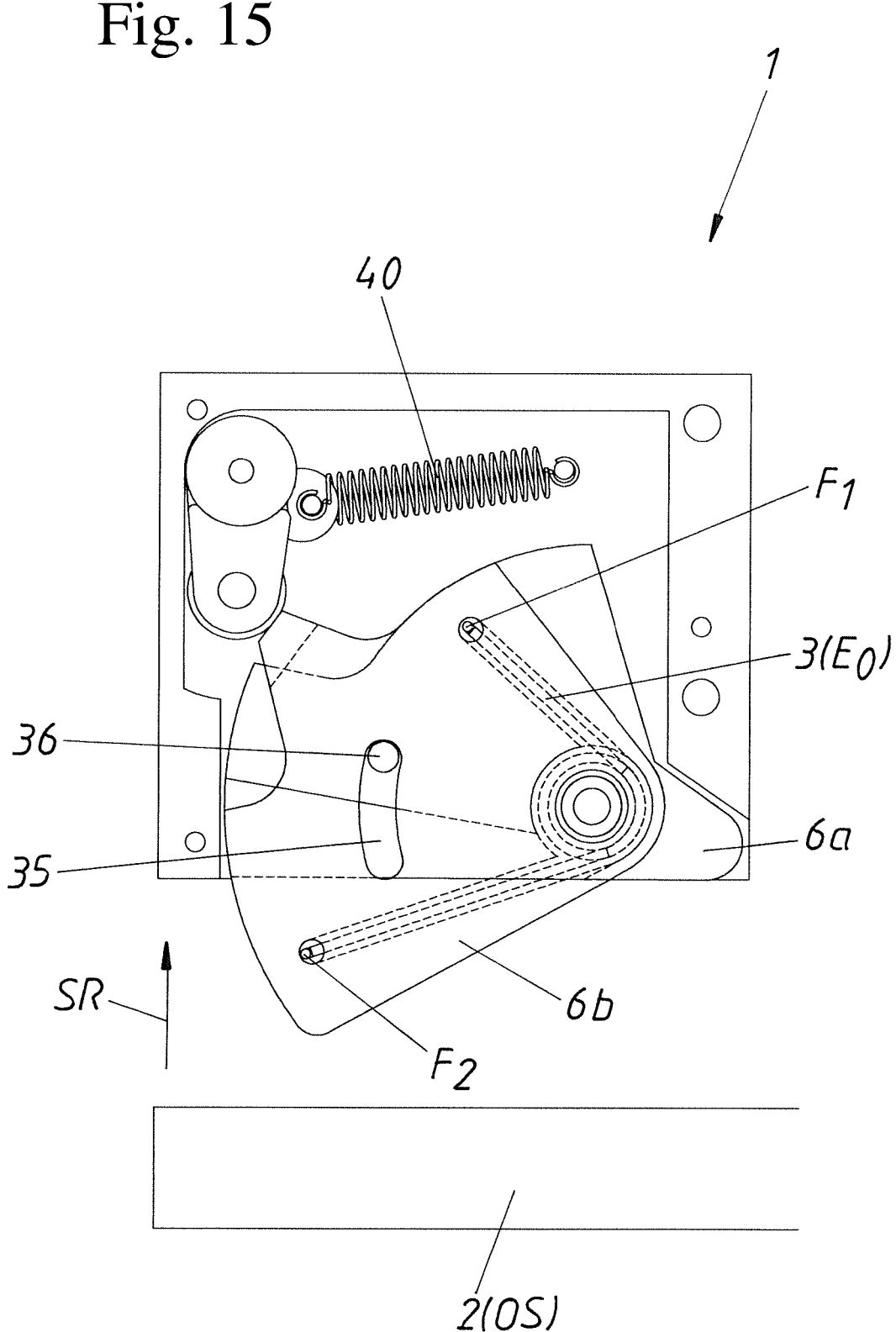
FIG. 15-21 show the movement sequence of the second embodiment of the drive device.

According to FIG. 15, a top view of the drive device 1 with the movable furniture part 2 is shown. In this case, the movable furniture part 2 is in an open position OS. As no external pressure acts onto the tensioning elements 6*a* and 6*b*, the ejection force storage member 3 is in the relaxed position $E_0$. This relaxed position $E_0$ is limited in that the limit bolt 36 abuts the elongated hole 35 on the right side. Thus, there can be quite a certain residual energy in the ejection force storage member 3. This relaxed position $E_0$, thus, insofar corresponds to an "energy-free" ejection force storage member 3 as it is determined by the limit stop 36 and the elongated hole 35. The tension spring 40 of the holding device 19 is relaxed and presses the guiding roll 41 to the second tensioning element 6*b*.

Figure 16:
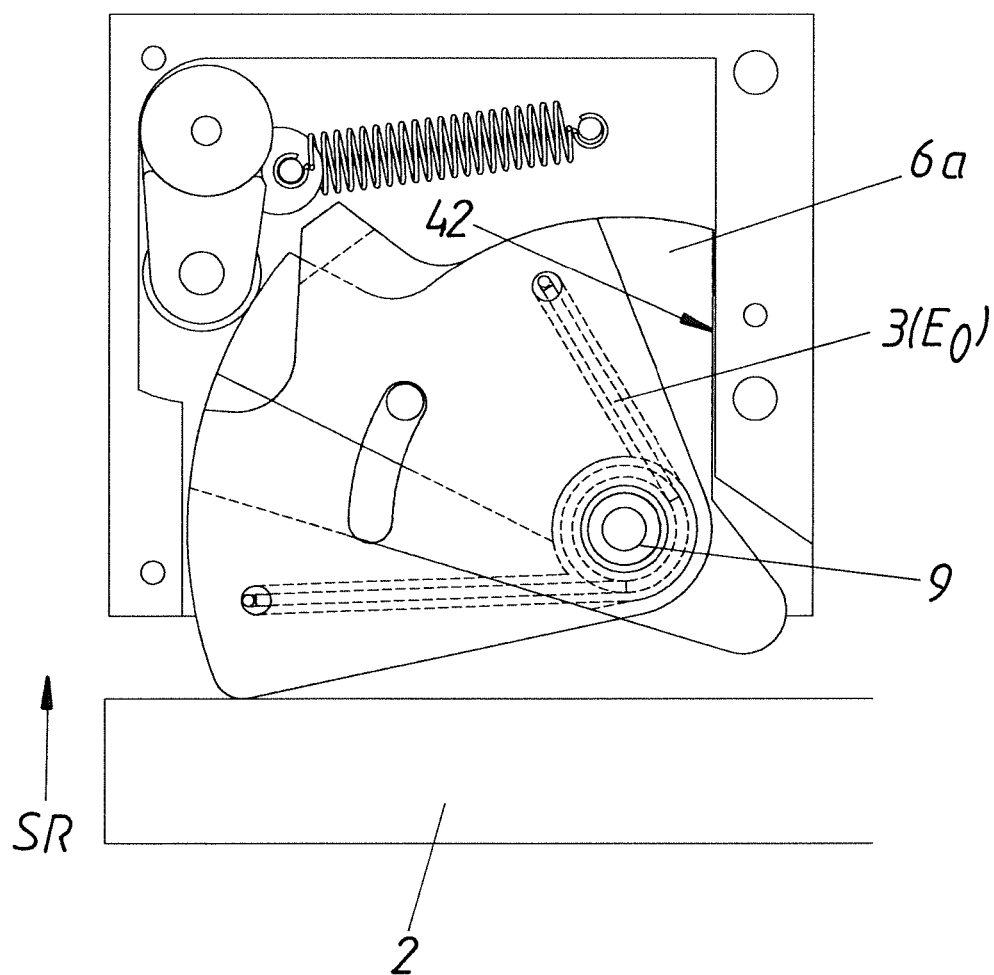

If now according to FIG. 16, the movable furniture part 2 is moved in closing direction SR, both tensioning elements 6*a* and 6*b* initially move synchronously around the axial bolt 9 until according to FIG. 16 the first tensioning element 6*a* abuts the limit stop 42 of the housing 8. In this FIG. 16, the ejection force storage member 3 is still in the relaxed position $E_0$.

Figure 17:
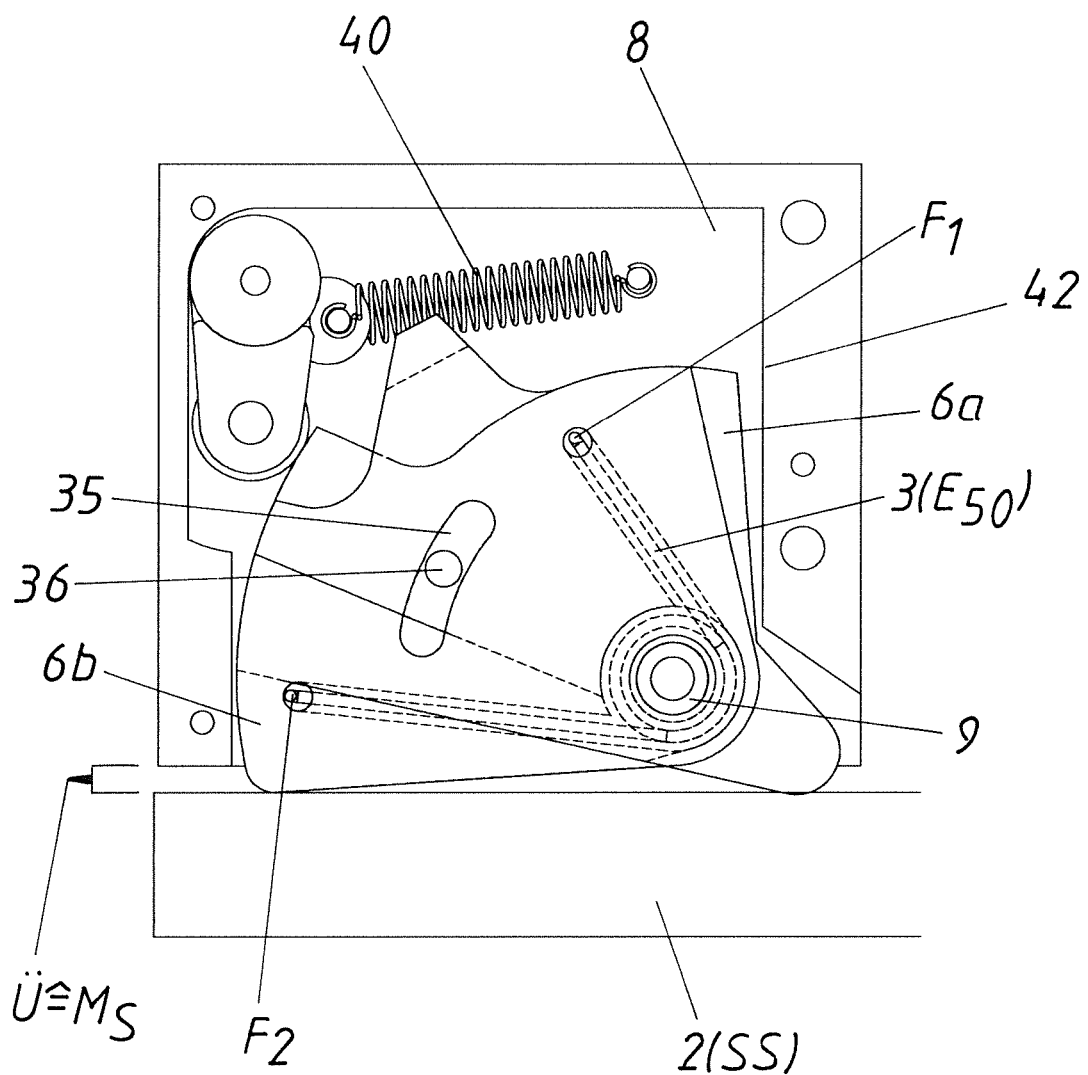

If the movable furniture part 2 is then further pressed in closing direction SR, the drive device 1 reaches the position according to FIG. 17. In this FIG. 17 the ejection force storage member 3 is already tensioned to a part and is thus in a partly tensioned position $E_{50}$. The movable furniture part 2 is approximately in the closed position SS in which the movable furniture part 2 abuts the second tensioning element 6*b* as well as the first tensioning element 6*a*. Because the movable furniture part 2 (in an ideal case exactly starting from the closed position SS) abuts both tensioning elements 6*a* and 6*b*, both tensioning elements 6*a* and 6*b* are moved relative to the housing 8 and to each other. The second tensioning element 6*b* moves clockwise, whereas the first tensioning element 6*a* moves counterclockwise. By this relative movement of the tensioning elements 6*a* and 6*b* to each other, the spring bases $F_1$ and $F_2$ are also shifted to each other. The change of the tension of the ejection force storage member 3 can also be seen in the position of the limit bolt 36 in the elongated hole 35.

Figure 18:
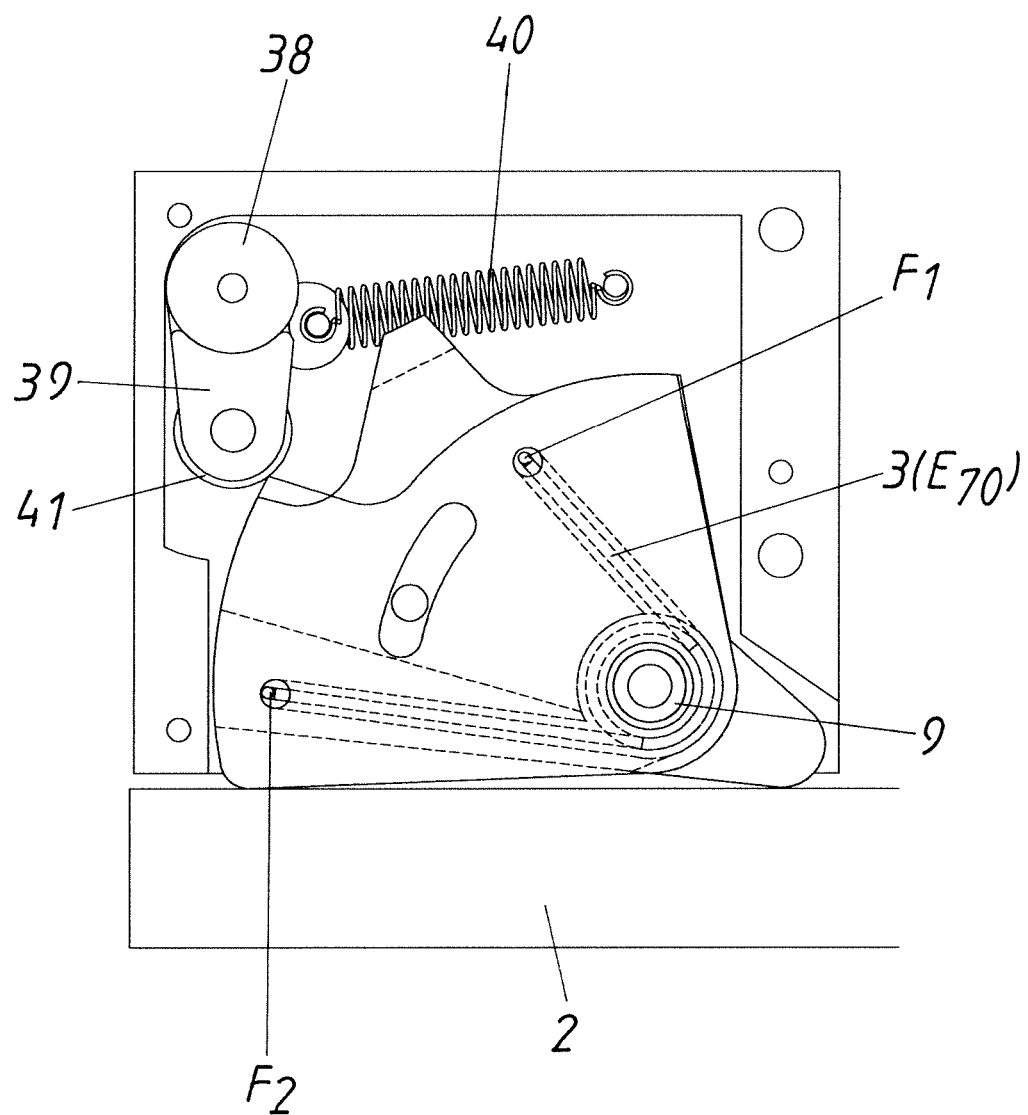

According to FIG. 18, the movable furniture part 2 has still further moved in closing direction SR, whereby the ejection force storage member 3 already is in a partly tensioned position $E_{70}$.

Figure 19:
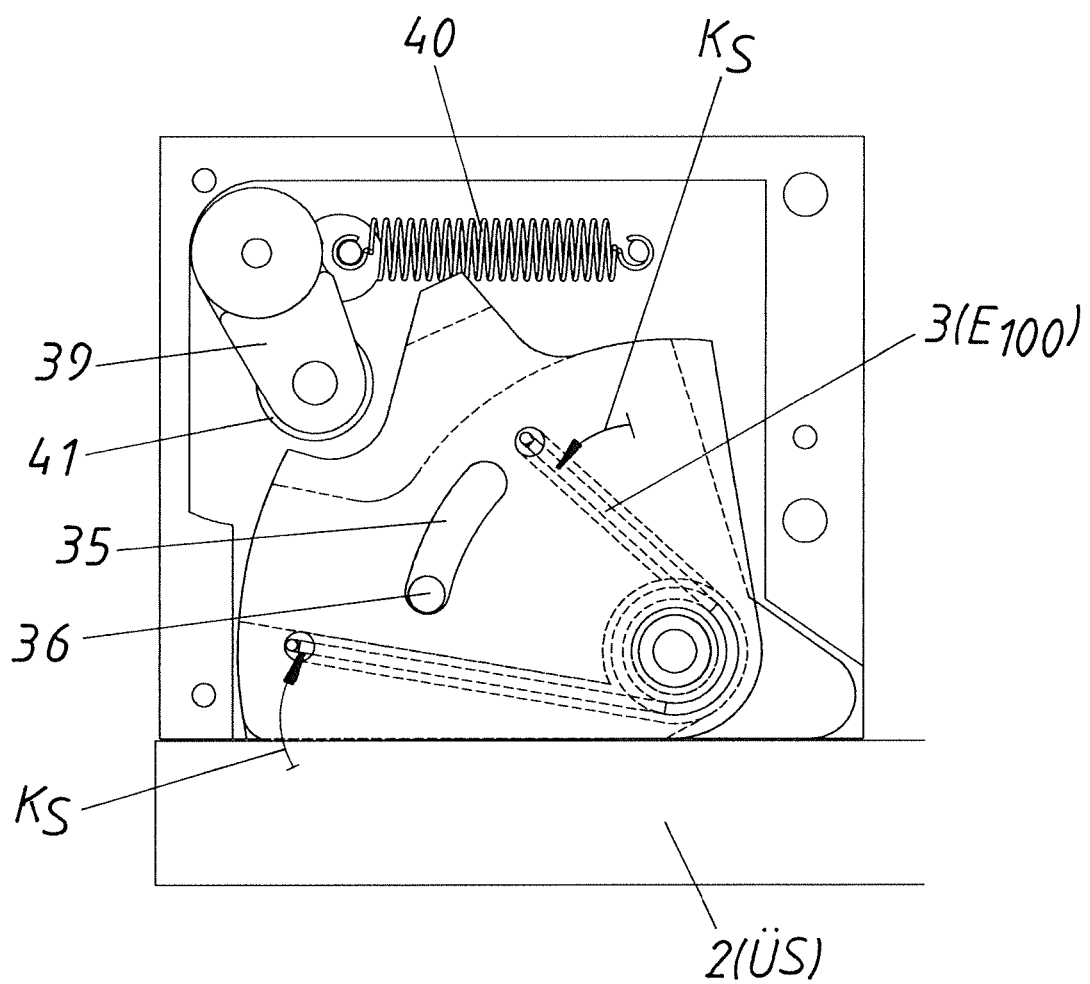

As soon as according to FIG. 19 the movable furniture part 2 fully abuts the housing 8 or the furniture carcass 21 respectively, the over-pressing position ÜS of the movable furniture part 2 is reached. Thereby, also the tensioned position $E_{100}$ of the ejection force storage member 3 is reached. Thus, both spring bases $F_1$ and $F_2$ each have travelled a part of the force storage tensioning distance $K_S$. As the feed roller 41 does no longer abut one of the tensioning elements 6*a* or 6*b*, also the tension spring 40 can relax and rotates the swiveling lever 39 counterclockwise. The limit bolt 36 has reached the left-sided end of the elongated hole 35.

Figure 20:
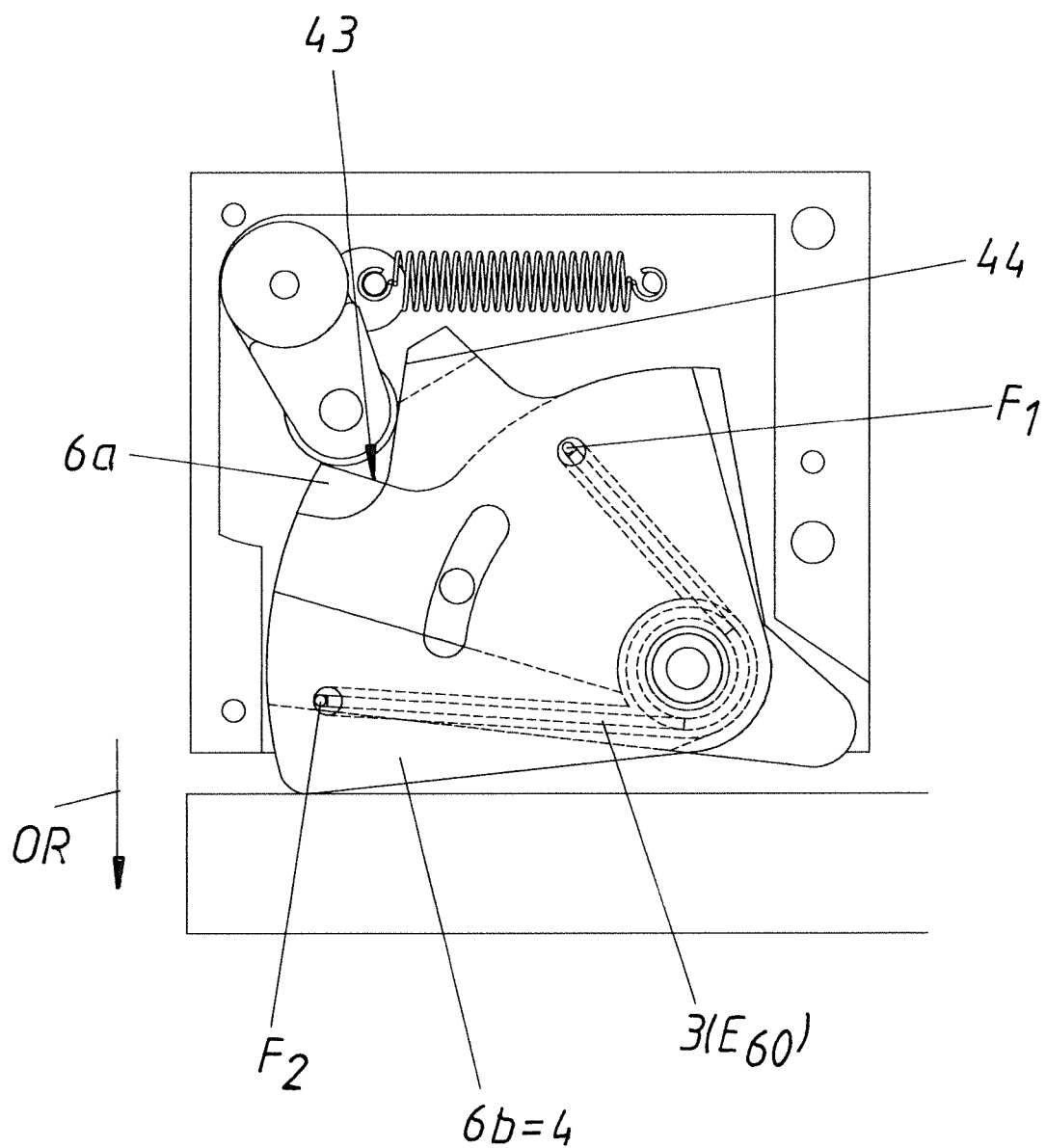

As soon as in the position according to FIG. 19 a user is no longer pressing onto the movable furniture part 2, the ejection force storage member 3 begins to relax as shown in FIG. 20 (in this case the energy E or the triggered turning moment of the ejection force storage member 3 has to be higher than the closing force of the hinges 22). As the feed roller 41 of the holding device 19 abuts the limit stop 43 of the first tensioning element 6*a*, this tensioning element 6*a* cannot rotate or relax clockwise. Hence, the whole loading energy E of the ejection force storage member 3 is only used for a relative movement of the spring base $F_2$ to the housing 8. Thereby, only the second tensioning element 6*b*—which thus forms the ejection element 4—is moved in opening direction OR.

Figure 21:
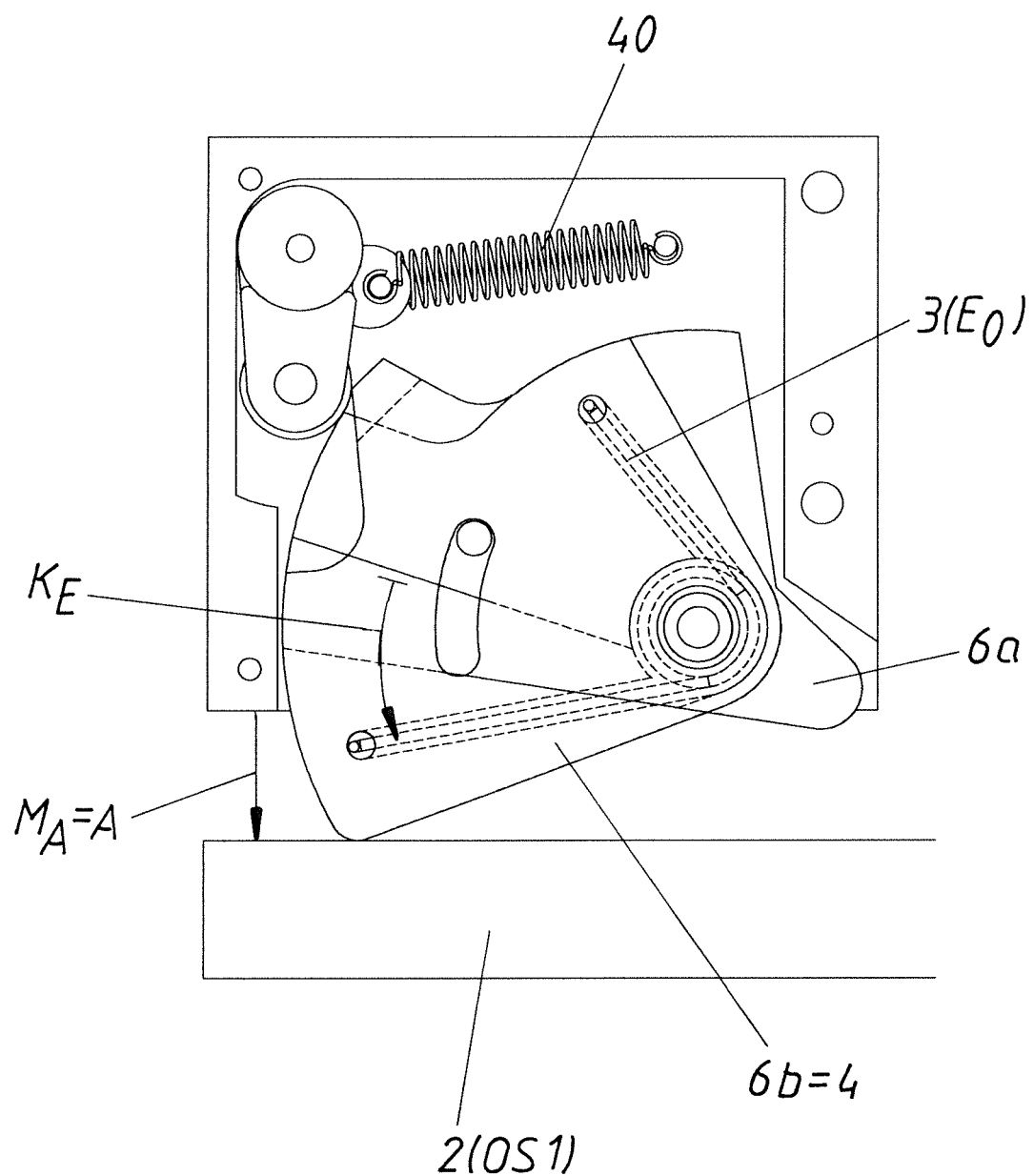

In FIG. 21 the ejection movement A is completed which corresponds to the furniture part ejection distance $M_A$. As also illustrated in FIG. 21, the loading energy E of the ejection force storage member 3 was only used for moving the second tensioning element 6*b*, whereby the force storage relaxing distance $K_E$ has been travelled. Consequently, also in this embodiment, the furniture part tensioning distance $M_S$ is smaller than the furniture part ejection distance $M_A$. In FIG. 21, the swiveling lever 39 of the holding device 19 has also again rotated clockwise, as the feed roller 41 abuts the deflection ramp 44 of the second tensioning element 6*b* and is forced back by the deflection ramp 44. Thus, the holding position of the first tensioning element 6*a* is released. In FIG. 21, the limit bolt 36 has also again reached the right-sided end of the elongated hole 35, whereby the ejection force storage member 3 is in the relaxed position $E_0$.

Generally, it has to be noted that the ejection force storage member can be, for example, an electromagnetic or pneumatic force storage member or an accumulator. Preferably the force storage member is formed as a spring. In this case, the design of the spring, in turn, is again arbitrary. So the spring for example can be formed as a pressure spring, a tension spring or similar. In both embodiments, the ejection force storage member is formed as a leg spring, wherein of course also other kinds of springs can certainly be used in the same functional manner. This is especially the case when no rotary movement for the loading of the ejection force storage member is used.

Further, it is noted that the drive device can certainly comprise also a locking device for locking the ejection element in a locking position. The locking device can preferably comprise a heart-curve shaped guide track. In the described embodiments, the "locking" in the closed position is reached in that the hinges hold the movable furniture part closed. Moreover, a "locking" is also not necessary in contrast to many known drive devices in the state of the art, because the ejection force storage member is indeed not yet or hardly tensioned in the closed position.

It shall further be mentioned that all preferred features apply for both embodiments—as long as it is possible and functionally reasonable.

Concerning the aspect of the invention, whereupon during the over-pressing movement at least half of the ejection force storage member loading energy is introduced, it should be noted that this can be carried out independently of the proportion of the furniture part tensioning distance to the force storage tensioning distance. This advantage of the "tensioning during over-pressing" is thus also given when the furniture part ejection distance is as large—or as "short"—as the furniture part tensioning distance during the over-pressing. Conversely, the shorter furniture part tensioning distance compared to the furniture part ejection distance is not necessarily dependent thereon, whether this "short" furniture part tensioning distance is in the region of the over-pressing movement. Rather, this "short" furniture part tensioning distance can also be somewhere between the second open position and the closed position. Preferably both aspects of the invention are implemented in a drive device, as it is also the case with the two specific embodiments.

LIST OF REFERENCE SIGNS

1 drive device
2 movable furniture part
3 ejection force storage member
4 ejection element
5 tensioning device
6 tensioning element
6a first tensioning element
6b second tensioning element
7 transmission device
8 housing
8a housing part
8b housing part
8c housing part
9 axial bolt
10 tensioning disk
11 latching elements
12 transmission disk
13 latching stops
14 lever
15 first end of the lever
16 second end of the lever
17 gear wheel
18 teeth on the transmission disk
19 holding device
20 item of furniture
21 furniture carcass
22 hinge
23 axial recess
24 axial recess
25 eccentrically arranged recess
26 recess for the second spring base
27 recess for the first spring base
28 guiding
29 rotary bearing
30 eccentric axis for the gear wheel
31 guiding elements
32 lever pivot bolt
33 lever pivot bolt
34 rotary bolt
35 elongated hole
36 limit bolt
37 holding recess for the limit bolt
38 rotary bearing
39 swiveling lever
40 tension spring
41 feed roller
42 limit stop
43 limit stop
44 deflection ramp
A ejection movement
Ü over-pressing movement
S closing movement
O opening movement
M furniture part movement distance
SS closed position
OS open position
OS1 first open position
OS2 second open position
ÜS over-pressing position
SR closing direction
OR opening direction
E (loading) energy
$M_S$ furniture part tensioning distance
$M_A$ furniture part ejection distance
$E_{0\text{-}50}$ relaxed or partly tensioned position
$E_{60}$ partly tensioned position
$E_{70}$ partly tensioned position
$E_{100}$ tensioned position
$K_S$ force storage tensioning distance
$K_E$ force storage relaxing distance
$F_1$ first spring base
$F_2$ second spring base
$E_R$ residual energy
$A_A$ ejection element ejection distance
$A_R$ ejection element returning distance

The invention claimed is:

1. A drive device for moving a movable furniture part, said drive device comprising:
a spring to be tensioned;
an ejection element configured to eject the movable furniture part from a closed position into an open position by an over-pressing movement of the movable furniture part in a closing direction into an over-pressing position behind the closed position, the ejection element being actuated by a spring force of the spring transmitted to the ejection element from the spring during a relaxation of the spring so as to move the ejection element and the movable furniture part in an opening direction;

a tensioning device including a tensioning element operatively engaging the spring to tension the spring with the spring force to be released during an ejection movement of the movable furniture part while the spring relaxes;

a transmission device including a gear wheel and a transmission disk operatively arranged between the tensioning element of the tensioning device and the ejection element, the transmission device being configured such that a first distance moved by the tensioning element to move the spring a tensioning distance during tensioning of the spring is less than a second distance moved by the ejection element due to movement of the spring a relaxing distance during ejection of the movable furniture part, the tensioning distance being equal to the relaxing distance;

wherein the spring, the tensioning device, and the transmission device are configured such that at least 50% of the spring force released by the spring during the ejection movement is introduced into the spring by the tensioning device during the over-pressing movement.

2. The drive device according to claim 1, wherein the tensioning device and the transmission device are configured such that at least 80% of the spring force released by the spring during the ejection movement is introduced into the spring by the tensioning device during the over-pressing movement.

3. The drive device according to claim 1, wherein the tensioning device and the transmission device are configured such that 100% of the spring force released by the spring during the ejection movement is introduced into the spring by the tensioning device during the over-pressing movement.

4. The drive device according to claim 1, wherein the tensioning element and the ejection element are formed separately.

5. An item of furniture comprising a furniture carcass, a movable furniture part, and the drive device according to claim 1 for moving the movable furniture part.

6. An item of furniture comprising:
a furniture body;
a movable furniture part; and
a drive device for moving a movable furniture part, said drive device comprising:
  a spring to be tensioned;
  an ejection element configured to eject the movable furniture part from a closed position into an open position by an over-pressing movement of the movable furniture part in a closing direction into an over-pressing position behind the closed position, the ejection element being actuated by a spring force of the spring transmitted to the ejection element from the spring during a relaxation of the spring so as to move the ejection element and the movable furniture part in an opening direction;
  a tensioning device including a tensioning element operatively engaging the spring to tension the spring with the spring force to be released during an ejection movement of the movable furniture part while the spring relaxes;
  a transmission device including a gear wheel and a transmission disk operatively arranged between the tensioning element of the tensioning device and the ejection element, the transmission device being configured such that a first distance moved by the tensioning element to move the spring a tensioning distance during tensioning of the spring is less than a second distance moved by the ejection element due to movement of the spring a relaxing distance during ejection of the movable furniture part, the tensioning distance being equal to the relaxing distance;
  wherein the movable furniture part is configured to travel the first distance during tensioning of the spring by the tensioning device, the spring being movable from a relaxed or partly tensioned position along the tensioning distance into a tensioned position during movement of the movable furniture part the first distance,
  wherein the moveable furniture part is configured to move the second distance during the ejection of the movable furniture part by the ejection element, the spring being movable from the tensioned position along the relaxing distance into the relaxed or partly tensioned position during movement of the movable furniture part the second distance.

7. The drive device according to claim 6, wherein the first distance corresponds to a furniture part movement distance during the over-pressing movement.

8. The drive device according to claim 6, wherein a length of the second distance is at least double a length of the first distance.

9. The drive device according to claim 6, wherein a proportion of the tensioning distance to the first distance during the over-pressing movement is larger than the proportion of the relaxing distance to the second distance during the ejection movement.

10. The drive device according to claim 4, wherein the tensioning device comprises:
  a housing;
  an axial bolt connected to the housing;
  a tensioning disk rotationally supported on the axial bolt, the tensioning disk comprising latching elements, the tensioning element being eccentrically connected to the tensioning disk;
  the transmission disk rotationally supported on the axial bolt, the transmission disk comprising latching stops for the latching elements; and
  the spring having a first spring base mounted to the tensioning disk and having a second spring base mounted to the housing.

11. The drive device according to claim 10, wherein the tensioning disk is configured to be rotated by the tensioning element relative to the transmission disk during the over-pressing movement, and the spring is configured to move from the relaxed or partly tensioned position to the tensioned position.

12. The drive device according to claim 11, wherein, in the tensioned position, the tensioning disk is latchable by at least one of the latching elements on a respective one of the latching stops of the transmission disk.

13. The drive device according to claim 10, wherein the transmission device further includes a lever movably supported via a first end thereof on the ejection element, and the lever is eccentrically and movably connected on a second end thereof to the gear wheel, the gear wheel meshing with teeth arranged on the transmission disk.

14. The drive device according to claim 4, wherein, at the end of the ejection movement, the spring is in the relaxed or partly tensioned position, and the spring is still partly tensioned and comprises residual spring force, wherein by this residual spring force of the spring, the ejection element is movable an ejection element returning distance in the closing direction after covering an ejection element ejecting distance.

15. The drive device according to claim 4, wherein the spring comprises a first spring base and a second spring base, and the spring being configured such that, during tensioning of the spring, both the first spring base and the second spring base are movable relative to a housing of the drive device, and during ejecting of the movable furniture part, the first spring base is fixed relative to the housing and the second spring base is movable relative to the housing.

16. The drive device according to claim 15, wherein the tensioning device comprises a first movable tensioning element and a second movable tensioning element, each being rotationally supported on the housing, wherein the first spring base of the spring is mounted to the first tensioning element and the second spring base of the spring is mounted to the second tensioning element.

17. The drive device according to claim 16, wherein the second tensioning element forms the ejection element.

18. The drive device according to claim 16, wherein, during the over-pressing movement, the first tensioning element and the second tensioning element are movable relative to each other and relative to the housing, whereby the spring moves from the relaxed or partly tensioned position to the tensioned position.

19. The drive device according to claim 16, wherein, during the ejection movement, one of the tensioning elements is held to the housing during more than half of the ejection movement by a holding device.

20. The drive device according to claim 15, wherein, in the closed position of the movable furniture part, the spring is in the relaxed or partly tensioned position, and the spring is partly tensioned when reaching the closed position by a closing movement of the movable furniture part.

* * * * *